United States Patent
Yamasaki et al.

(10) Patent No.: US 8,233,371 B2
(45) Date of Patent: Jul. 31, 2012

(54) OBJECTIVE LENS, OPTICAL HEAD AND OPTICAL DISC DEVICE

(75) Inventors: Fumitomo Yamasaki, Nara (JP); Katsuhiko Hayashi, Osaka (JP); Sadao Mizuno, Osaka (JP); Hideki Aikoh, Osaka (JP)

(73) Assignee: Panasonic Corporation, Osaka (JP)

( * ) Notice: Subject to any disclaimer, the term of this patent is extended or adjusted under 35 U.S.C. 154(b) by 724 days.

(21) Appl. No.: 12/159,425

(22) PCT Filed: Dec. 27, 2006

(86) PCT No.: PCT/JP2006/326068
§ 371 (c)(1),
(2), (4) Date: Jun. 27, 2008

(87) PCT Pub. No.: WO2007/074870
PCT Pub. Date: Jul. 5, 2007

(65) Prior Publication Data
US 2010/0220578 A1 Sep. 2, 2010

(30) Foreign Application Priority Data

Dec. 28, 2005 (JP) .................................. 2005-377928
Feb. 14, 2006 (JP) .................................. 2006-036282

(51) Int. Cl.
G11B 7/00 (2006.01)
(52) U.S. Cl. ............................. 369/112.23; 369/112.01
(58) Field of Classification Search .............. 369/112.23
See application file for complete search history.

(56) References Cited

U.S. PATENT DOCUMENTS 6,373,807 B1* 4/2002 Ohtaki et al. ............ 369/112.01
(Continued)

FOREIGN PATENT DOCUMENTS
JP 2000-090477 3/2000
(Continued)

OTHER PUBLICATIONS

International Search Report for corresponding Application No. PCT/JP2006/376068 dated Jan. 30, 2007.

Primary Examiner — Lixi C Simpson
(74) Attorney, Agent, or Firm — Renner, Otto, Boisselle & Sklar, LLP

(57) ABSTRACT

Provides an objective lens, an optical head and an optical disc apparatus (drive) capable of compensating for various types of aberrations including wavelength changes for a plurality of types of optical discs including high density optical discs, DVDs and CDs with a good wavelength dispersion compensation ability and thus capable of providing good recording or reproduction characteristics.

The objective lens according to the present invention includes a first lens and a second lens substantially in close contact with each other such that optical axes thereof match each other, and acts as a convex lens as a whole. Each lens includes a central portion including the optical axis and a peripheral portion located in a periphery of the central portion. The central portion of the first lens acts as a convex lens; and the central portion of the second lens acts as a concave lens. Where the refractive index of the first lens at d line (wavelength: 587.56 nm) is nd1, the Abbe constant of the first lens represented using the refractive indices at d line, F line (wavelength: 486.13 nm) and C line (wavelength: 656.27 nm) is vd1, the refractive index of the second lens at d line is nd2, and the Abbe constant of the second lens represented using the refractive indices at d line, F line and C line is vd2, the objective lens fulfills nd1>nd2 and vd1>vd2.

13 Claims, 17 Drawing Sheets

U.S. PATENT DOCUMENTS

| | | | |
|---|---|---|---|
| 7,054,074 B2 * | 5/2006 | Mizuno et al. | 359/719 |
| 7,142,497 B2 * | 11/2006 | Hirai | 369/112.17 |
| 7,852,736 B2 * | 12/2010 | Koike | 369/112.07 |
| 2002/0021649 A1 | 2/2002 | Yoo et al. | |
| 2002/0041450 A1 * | 4/2002 | Katsuma | 359/719 |
| 2002/0060972 A1 | 5/2002 | Takeuchi et al. | |
| 2002/0060973 A1 | 5/2002 | Yamanouchi et al. | |
| 2003/0067861 A1 | 4/2003 | Kimura | |
| 2003/0107824 A1 * | 6/2003 | Takeuchi | 359/796 |
| 2004/0085662 A1 | 5/2004 | Mimori et al. | |
| 2004/0257958 A1 | 12/2004 | Kimura et al. | |
| 2005/0083580 A1 | 4/2005 | Hendriks | |
| 2005/0275955 A1 | 12/2005 | Sekine | |

FOREIGN PATENT DOCUMENTS

| | | |
|---|---|---|
| JP | 2002-100070 | 4/2002 |
| JP | 2002-175639 | 6/2002 |
| JP | 2002-182107 | 6/2002 |
| JP | 2003-015032 | 1/2003 |
| JP | 2004-053834 | 2/2004 |
| JP | 2004-171716 | 6/2004 |
| JP | 2005-513701 | 5/2005 |
| JP | 2005-182861 | 7/2005 |
| JP | 2005-209321 | 8/2005 |
| WO | 2004/053557 | 6/2004 |
| WO | WO 2005076266 A1 * | 8/2005 |

* cited by examiner

*FIG.1* OPTICAL DISC SIDE
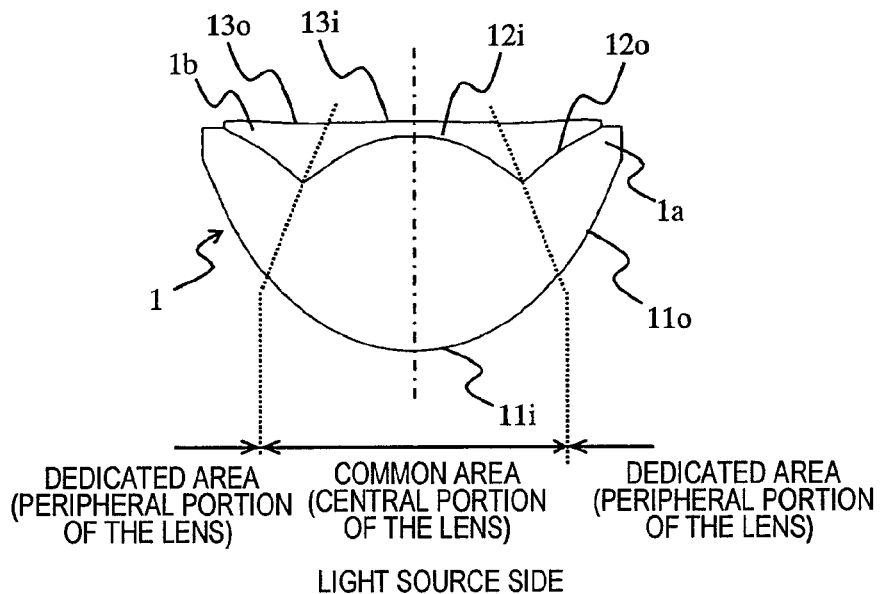
LIGHT SOURCE SIDE
*FIG.2*
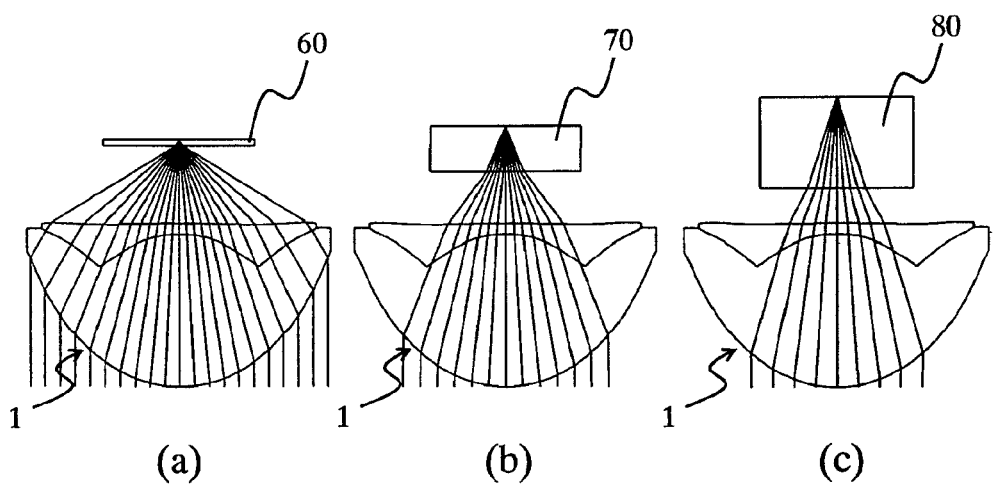
(a)   (b)   (c)

FIG.4
WAVEFRONT ABERRATION OF DVD ($\lambda$ = 655 nm)
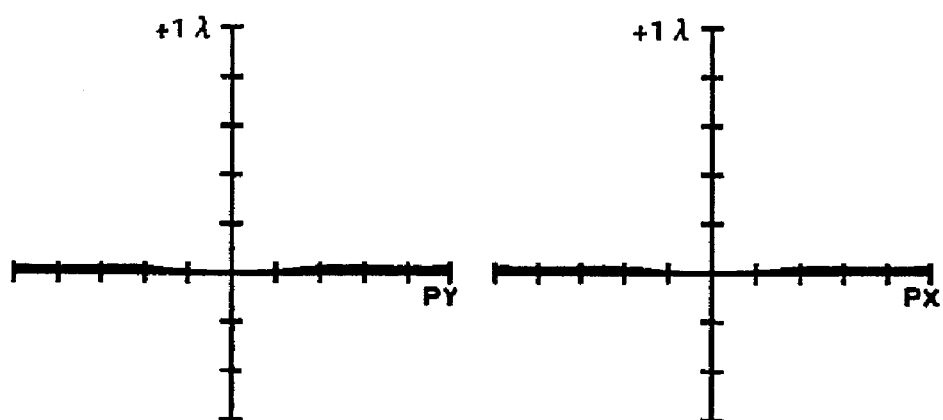
(a) 0.0deg
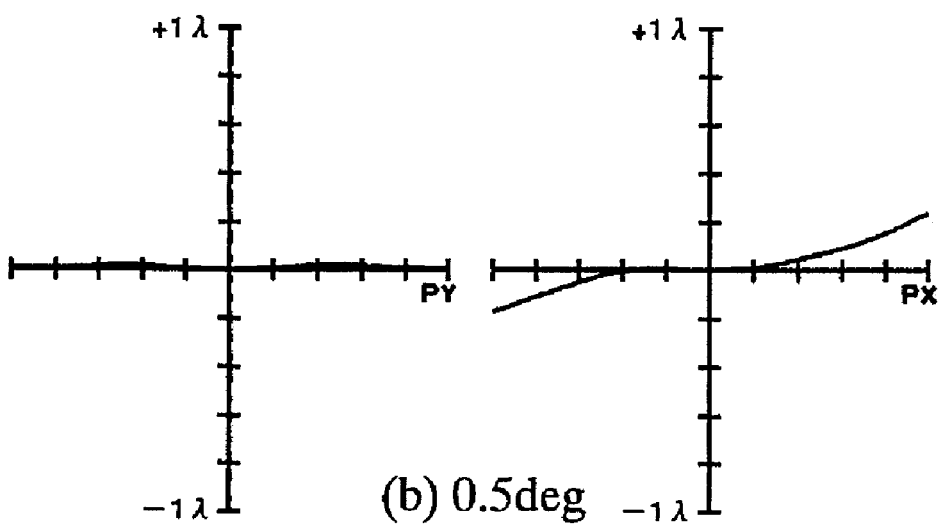
(b) 0.5deg

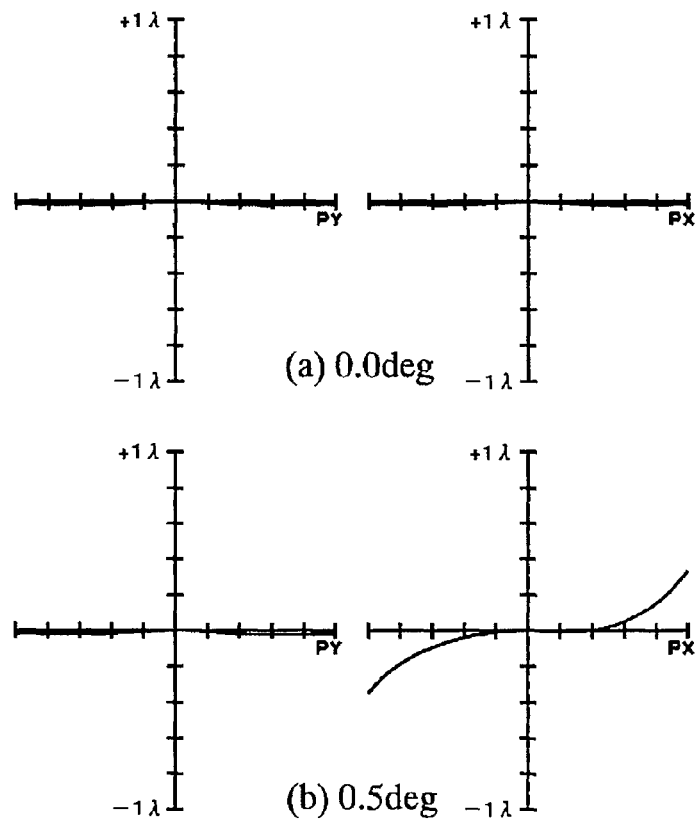
FIG.5 WAVEFRONT ABERRATION OF CD ($\lambda$ = 785 nm)
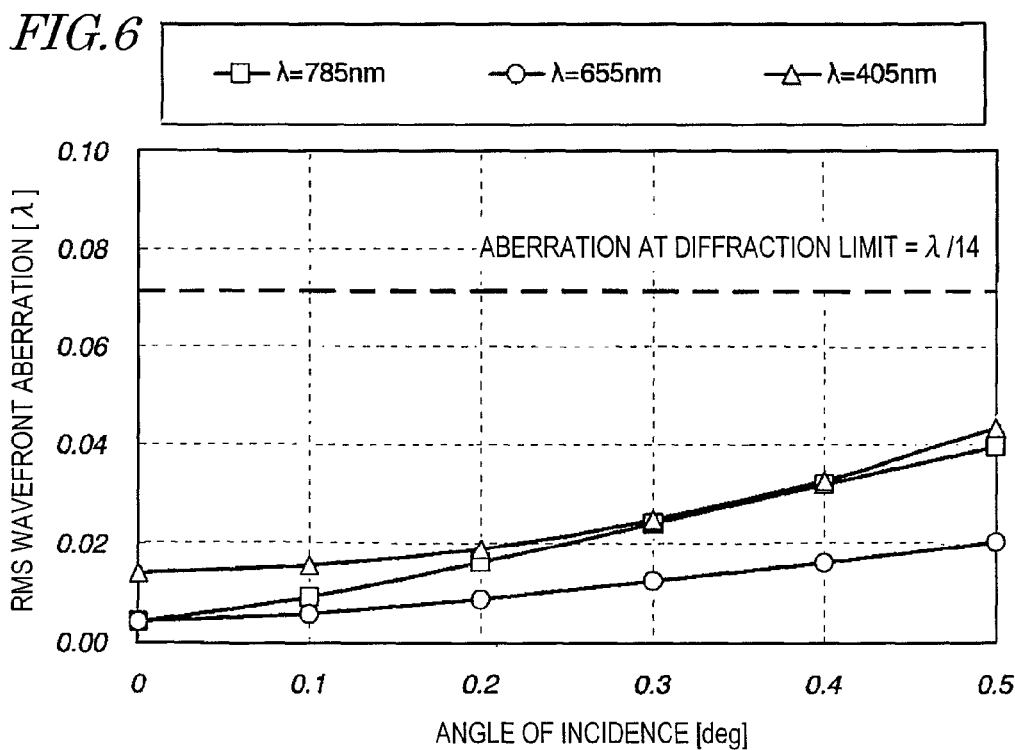
FIG.6

DEDICATED AREA | COMMON AREA | DEDICATED AREA (a)　　　　　(b)　　　　　(c)

(a)    (b)

LIGHT SOURCE SIDE

PARALLEL LIGHT    DIVERGING LIGHT    CONVERGING LIGHT
(a)    (b)    (c)

(a)　　　　　　　(b)

CONVENTIONAL ART

OBJECTIVE LENS, OPTICAL HEAD AND OPTICAL DISC DEVICE

TECHNICAL FIELD

The present invention relates to an optical head including a plurality of light sources of different wavelengths and performing optical information recording to or reproduction from information recording mediums such as a plurality of types of optical discs or the like; an objective lens usable for such an optical head; and an optical disc apparatus including such an optical head.

BACKGROUND ART

Recently, as semiconductor lasers for emitting blue violet laser light have been put into practical use, a Blu-ray Disc (hereinafter, referred to as the "BD"), which is an optical information recording medium (hereinafter, referred to also as the "optical disc") having a higher density and a larger capacity than CDs (Compact Discs) and DVDs (Digital Versatile Discs) while having the same disc diameter therewith, has been put into practical use. A BD is an optical disc having a protective substrate thickness of about 0.1 mm used for performing information recording and reproduction with a blue violet laser light source of a wavelength of about 400 nm and an objective lens having a numerical aperture (NA) improved to 0.85. The "protective substrate thickness" means a thickness of a transparent layer (protective substrate) existing between a face of the optical disc on the laser light incidence side and the information recording layer.

A high density optical disc having a protective substrate thickness of about 0.6 mm also used with a blue violet laser light source of a wavelength of about 400 nm and an objective lens having a numerical aperture of 0.65 are also under active studies and development. (These optical discs usable for performing recording or reproduction with a blue violet laser light source are comprehensively referred to as the "high density optical discs".)

Under the circumstances, an optical head compatible for performing information recording and reproduction by collecting laser light of different wavelengths to an information recording layer of each of these optical discs having different protective substrate thicknesses using one objective lens are now proposed.

For example, as an objective lens usable for an optical head for performing recording to or reproduction from high density optical discs and DVDs, an optical head as shown in FIG. 28 is reported by Patent Document 1. This optical head uses, as an objective lens 101, a complex lens including a reference lens 101a formed of a synthetic resin material or a glass material and a close contact lens 101b closely contacting the reference lens 101a and formed of an ultraviolet curable resin material.

FIG. 28 shows a face 111 of the reference lens 101a on the light source side, a close contact face 112 which is a face of the reference lens 101a on the optical disc side and also is a face of the close contact lens 101b on the light source side, and a face 113 of the close contact lens 101b on the optical disc side.

According to this conventional example, it is described that an aberration caused to the laser light of two wavelengths, i.e., red laser light and blue violet laser light, by a difference in the wavelength can be compensated for.

Patent Document 2 reports an objective lens, for an optical head, which provides good optical performances. The objective lens uses laser light of three wavelengths of about 405 nm, about 655 nm and about 785 nm, and provides a superb diffraction limited performance for optical discs having different protective substrate thicknesses.

According to this conventional example, it is described that recording to or reproduction from high density optical discs, DVDs and CDs can be performed with blue violet laser light, using an objective lens 201. As shown in FIG. 29, the objective lens 201 includes a reference lens 201a and a close contact lens 201b cemented to or bonded to a face 212 of the reference lens 201a on the optical disc side. The close contact lens 201b is in close contact or substantially close contact with the face 212 of the reference lens 201a and is formed of a material different from that of the reference lens 201a.

The objective lenses described in the two conventional examples utilize the difference in the refractive index and dispersion between the reference lens and the close contact lens, and compensate for the aberration for two or three different wavelengths only by the refractive power of the lens. Therefore, as opposed to an objective lens using diffraction, the above-described objective lenses lose substantially no light amount and provide a high transmission efficiency for all the wavelengths.

Patent Document 1: Japanese Laid-Open Patent Publication No. 2000-90477
Patent Document 2: International Publication No. 2004/053557 pamphlet

DISCLOSURE OF THE INVENTION

Problems to be Solved by the Invention

According to the conventional art, the wavelength dispersion compensation ability is not taken into consideration, and also it is difficult to sufficiently obtain the correction effect on the spherical aberration caused by a difference in the protective substrate thickness among optical discs.

For example, Patent Document 1 describes a wavefront aberration to blue violet laser light and a wavefront aberration to red laser light. However, since there is no reference to a change in the best image point position of the wavefront aberration, Patent Document 1 cannot be regarded as considering the wavelength dispersion compensation ability. In addition, Patent Document 1 does not include any specific description on the thickness of the protective substrate of the optical disc used for recording or reproduction, or on the numerical aperture of the objective lens. Therefore, it is not clear whether the correction effect on the spherical aberration caused by a difference in the protective substrate thickness among optical discs is sufficiently obtained. These may possibly be problematic especially for recordable optical heads.

Patent Document 1 does not mention recording to or reproduction from CDs using infrared laser light having a wavelength of about 785 nm. Therefore, the objective lens described in Patent Document 1 is not compatible for performing recording to or reproduction from high density optical discs, DVD and CDs.

By contrast, in the conventional example described in Patent Document 2, examples 1 through 5 refer to compatibility for performing information recording to or reproduction from high density optical discs, DVD and CDs, using an objective lens which includes a reference lens formed of a glass material and a close contact lens formed of a resin material.

However, for instance, in example 1 of Patent Document 2, a change in the best image point position of the RMS wavefront aberration with respect to a wavelength change of ±1 nm to the central wavelength of blue violet laser light of 405 nm is as large as 1 μm or greater. With such a value of change, the wavelength dispersion compensation ability is not considered to be sufficient.

In examples 6 and 7 of Patent Document 2, designing examples of an objective lens having a good wavelength dispersion compensation ability is shown. However, in this objective lens, both the reference lens and the close contact lens are formed of glass materials, and no specific method for producing the objective lens is described. In actuality, it is difficult to first form two glass lenses by molding with high precision and then produce an objective lens by cementing or bonding the two glass lenses.

Example 7 of Patent Document 2 describes that laser light is incident on the objective lens as diverging light for recording data to or reproducing data from a CD or a DVD. However, since the object point distance of, especially, a CD is as small as 19.5 mm, it is practically very difficult to produce an optical head. In fact, no specific structure of the optical head is described.

The spherical aberration is caused when the central wavelength of the laser light for high density optical discs is varied. The spherical aberration (chromatic spherical aberration) caused when the wavelength is varied by ±5 nm exceeds 100 mλ. However, example 1 of Patent Document 2 does not present any view on such an important issue, or does not provide any method for compensating for the chromatic spherical aberration.

With the optical head described in Patent Document 2, the object point distances of the three wavelengths are different from one another. Therefore, it is expected that, for example, the arrangement of the light emitting point and the light receiving point of each wavelength on the optical head is complicated. However, Patent Document 2 does not describe anything about this problem. For instance, in example 7 of Patent Document 2, the object point distances of a CD and a DVD are respectively 20 mm and 38 mm, which are very small. Patent Document 2 does not disclose any structure of such a small optical head, and it is not clear whether such an optical head is feasible.

The working distance (WD) of an objective lens with respect to a CD is preferably large from the viewpoint of avoiding the collision of the objective lens and the CD. However, in example 4 of Patent Document 2, the working distance of the objective lens is as small as about 0.38 mm at the maximum, which is not sufficient for an objective lens used for an optical head for recordable CDs.

An object of the present invention is to provide an objective lens, an optical head and an optical disc apparatus (drive) capable of compensating for various types of aberrations including wavelength changes for a plurality of types of optical discs including high density optical discs, DVDs and CDs with a good wavelength dispersion compensation ability and thus capable of providing good recording or reproduction characteristics.

Means for Solving the Problems

An objective lens according to the present invention is incorporated into an optical head. The objective lens includes a first lens and a second lens substantially in close contact with each other such that optical axes thereof match each other, and acts as a convex lens as a whole. The first lens and the second lens each include a central portion including the optical axis and a peripheral portion located in a periphery of the central portion. The central portion of the first lens acts as a convex lens, and the central portion of the second lens acts as a concave lens. Where the refractive index of the first lens at d line (wavelength: 587.56 nm) is nd1, the Abbe constant of the first lens represented using the refractive indices at d line, F line (wavelength: 486.13 nm) and C line (wavelength: 656.27 nm) is νd1, the refractive index of the second lens at d line is nd2, and the Abbe constant of the second lens represented using the refractive indices at d line, F line and C line is νd2, the objective lens fulfills $$nd1>nd2 \text{ and } vd1>vd2.$$

The refractive index nd1 may fulfill 1.60<nd1<0.85; the refractive index nd2 may fulfill 1.45<nd2<0.60; the Abbe constant νd1 may fulfill 40<νd1<60; and the Abbe constant νd2 may fulfill 20<νd2<40.

The first lens and the second lens may be cemented or bonded together.

The objective lens may further comprise a holder for holding the first lens and the second lens substantially in close contact with each other.

The first lens may be formed of a glass material, and the second lens may be formed of a resin material.

The resin material may have a glass transition temperature of 300° C. or lower.

The second lens may be formed of an ultraviolet curable resin.

The resin material may be polycarbonate.

The first lens and the second lens may be formed of glass materials.

The first lens and the second lens may be formed of glass materials having different glass transition temperatures.

The glass transition temperature of the glass material of the first lens and the glass transition temperature of the glass material of the second lens may be different from each other by 200° C. or greater.

The objective lens may have three lens faces crossing the optical axis of a first lens face which is a lens face of the first lens which is not in contact with the second lens, a second lens face which is a border between the first lens and the second lens substantially in close contact with each other, and a third lens face which is a lens face of the second lens which is not in contact with the first lens; and among effective areas of at least one of the first lens face, the second lens face and the third lens face, a central effective area including the optical axis and a peripheral effective area located in a periphery of the central effective area may be formed in different aspheric shapes.

In each of the first lens face, the second lens face and the third lens face, the central effective area and the peripheral effective area may be formed in different aspheric shapes.

Where an angle between a tangent plane contacting an arbitrary point on a plane within an effective diameter of the second lens face and a reference plane which is a plane perpendicular to the optical axis is θ, the value of θ may vary at a border between the central effective area and the peripheral effective area of the second lens face.

At the border between the central effective area and the peripheral effective area of the second lens face, at least one of the absolute value and the sign of θ may vary.

An optical step may be provided at the border between the central area and the peripheral area of at least one of the first lens face, the second lens face and the third lens face.

The peripheral effective area of the first lens face may have a diffraction structure for diffracting light of a prescribed wavelength at a diffraction efficiency of 80% or higher.

An optical head according to the present invention comprises a plurality of light sources for emitting light of different wavelengths; and an objective lens of claim 12 for converging light emitted from one of the plurality of light sources.

The objective lens may converge light from a first light source among the plurality of light sources by the central portion and the peripheral portion thereof; and may converge light from a second light source among the plurality of light sources substantially by only the central portion thereof.

The first light source may emit light of a shorter wavelength than the second light source.

The optical head may further comprise a conversion section for converting the light into substantially parallel light, diverging light or converging light in accordance with the wavelength of the light and causing the converted light to be incident on the objective lens.

The conversion section may convert the light emitted by the first light source into substantially parallel light.

The conversion section may convert the light emitted by the second light source into converging light, diverging light or substantially parallel light.

The optical head may further comprise a third light source for emitting light of a longer wavelength than the first light source and the second light source. The conversion section may convert light emitted by the third light source into diverging light.

The optical head may further comprise an aperture restriction section for restricting a diameter of a beam of the light in accordance with the wavelength of the light which is being emitted by the light source.

The optical head may further comprise a third light source for emitting light of a longer wavelength than the first light source and the second light source. The first light source may emit light of a first wavelength $\lambda 1$, the second light source may emit light of a second wavelength $\lambda 2$, and the third light source may emit light of a third wavelength $\lambda 3$. The wavelength $\lambda 1$, the wavelength $\lambda 2$ and the wavelength $\lambda 3$ may fulfill 350 nm<$\lambda 1$<450 nm, 600 nm<$\lambda 2$<700 nm, and 700 nm<$\lambda 3$<850 nm.

The optical head may further comprise a conversion section for converting the light of the wavelength $\lambda 1$ into substantially parallel light, converting the light of the wavelength $\lambda 2$ into converging light and converting the light of the wavelength $\lambda 3$ into diverging light, and causing the converted light to be incident on the objective lens.

The optical head may further comprise a chromatic aberration correction element for correcting a chromatic aberration. The chromatic aberration correction element may correct a chromatic aberration of the objective lens caused along with a change in the wavelength of the light of the wavelength $\lambda 1$.

When the light of the wavelength $\lambda 3$ is collected by the objective lens, an interval W between an arbitrary point within an effective area of the objective lens and an optical recording medium on which the light is to be collected may be 0.30 mm or greater.

When the light of the wavelength $\lambda 1$ is collected on the optical recording medium, a spherical aberration may be caused at a focal point of the light by a thickness of a light transmission layer of the optical recording medium; and the conversion section may vary the spherical aberration caused at the focal point of the light of the wavelength $\lambda 1$.

The conversion section may include a collimator lens for converting at least the light of the wavelength $\lambda 1$ into substantially parallel light and causing the light to be incident on the objective lens, and a driving section for moving the collimator lens in an optical axis direction based on a driving signal corresponding to the wavelength of the light which is being output.

Where a position of the collimator lens at which the light of wavelength $\lambda 1$ is allowed to be incident on the objective lens as substantially parallel light is set as a reference position, the driving section may move the collimator lens toward the objective lens from the reference position and cause the light of the wavelength $\lambda 2$ to be incident on the objective lens based on a driving signal corresponding to the light of the wavelength $\lambda 2$; and may move the collimator lens in an opposite direction from the objective lens from the reference position and cause the light of the wavelength $\lambda 3$ to be incident on the objective lens based on a driving signal corresponding to the light of the wavelength $\lambda 3$.

The conversion section may be formed using at least a refractive index distribution variable material, and the refractive index distribution variable material may have a refractive index distribution thereof varied by an electric field, a magnetic field or heat externally applied in accordance with the wavelength of the light which is being output.

The conversion section may be a lens formed using a plurality of types of non-miscible liquids having different refractive indices, and an interface between the plurality of types of non-miscible liquids may have a curvature thereof varied in accordance with the wavelength of the light which is being output.

The second light source and the third light source may be located at substantially the same position.

The second light source and the third light source may be integrated together.

The optical head may further comprise a relay lens having a negative focal length on an optical path, between the first light source and the conversion section, which only the light of the wavelength $\lambda 1$ passes.

The chromatic aberration correction element may have a phase step; and the phase step may be constructed such that a difference in an optical path length caused when the light of the wavelength $\lambda 1$ passes the phase step is substantially 10 times the wavelength $\lambda 1$, and thus correct the spherical aberration caused at a position of a focal point of the light by the change in the wavelength of the light of the wavelength $\lambda 1$.

The optical head may further comprise an optical element acting as a phase step for a part of the light of the wavelength $\lambda 1$. The phase step may be constructed such that a difference in an optical path length caused when the light of the wavelength $\lambda 1$ passes the phase step is substantially 10 times the wavelength $\lambda 1$, and thus correct the spherical aberration caused at a position of a focal point of the light by the change in the wavelength of the light of the wavelength $\lambda 1$.

Among the spherical aberrations caused along with the change in the wavelength of the light of the wavelength of $\lambda 1$, the conversion section may mainly correct a third-order spherical aberration; and the phase step may mainly correct a five- or higher-order spherical aberration.

An optical drive according to the present invention comprises the above-described optical head; a motor for driving an optical recording medium to rotate; and a control section for controlling the optical head and the motor.

An objective lens according to the present invention is incorporated into an optical head. The objective lens includes a first lens and a second lens substantially in close contact with each other such that optical axes thereof match each other, and acts as a convex lens as a whole. The first lens and the second lens each include a central portion including the optical axis and a peripheral portion located in a periphery of the central portion. The central portion of the first lens acts as a convex lens, and the central portion of the second lens acts as a concave lens. At least one lens face of the objective lens crossing the optical axis includes a central effective area including the optical axis and a peripheral effective area not including the optical axis, and the central effective area and the peripheral effective area are formed in different aspheric shapes.

The first lens and the second lens may define a first lens face which is a lens face of the first lens which is not in contact with the second lens, a second lens face which is a border between the first lens and the second lens substantially in close contact with each other, and a third lens face which is a lens face of the second lens which is not in contact with the first lens; and among effective areas of at least one of the first lens face, the second lens face and the third lens face, a central effective area including the optical axis and a peripheral effective area located in a periphery of the central effective area may be formed in different aspheric shapes.

In each of the first lens face, the second lens face and the third lens face, the central effective area and the peripheral effective area may be formed in different aspheric shapes.

Where an angle between a tangent plane contacting an arbitrary point on a plane within an effective diameter of the second lens face and a reference plane which is a plane perpendicular to the optical axis is θ, the value of θ may vary at a border between the central effective area and the peripheral effective area of the second lens face.

At the border between the central effective area and the peripheral effective area of the second lens face, at least one of the absolute value and the sign of θ may vary.

An optical step may be provided at the border between the central area and the peripheral area of at least one of the first lens face, the second lens face and the third lens face.

The peripheral effective area of the first lens face may have a diffraction structure for diffracting light of a prescribed wavelength at a diffraction efficiency of 80% or higher.

Effects of the Invention

The present invention provides an objective lens having a high diffraction limited performance and a superb wavelength dispersion compensation ability for high density optical discs such as BDs or the like, DVDs and CDs. The structure of an optical head adopting this objective lens is simplified, and thus can be reduced in size. As a result, an optical disc apparatus adopting such an optical head is also reduced in size or thickness, and can be produced at low cost. Such an optical disc apparatus has superb recording and reproduction capabilities owing to the above-described capabilities of the objective lens.

BRIEF DESCRIPTION OF THE DRAWINGS

FIG. 1 is a view showing a structure of an objective lens 1 according to Embodiment 1.

FIGS. 2(a) through (c) each show a state of a light beam when laser light is focused on an information recording layer of a BD 60, a DVD 70 or a CD 80 using the objective lens 1 in Embodiment 1.

FIG. 4 is a wavefront aberration diagram obtained when laser light having a wavelength of 655 nm is focused on the DVD BD 70.

FIG. 5 is a wavefront aberration diagram obtained when laser light having a wavelength of 785 nm is focused on the CD 80.

FIG. 6 is an RMS (Root Mean Square) wavefront aberration diagram in which the horizontal axis represents the angle of incidence.

DESCRIPTION OF THE REFERENCE NUMERALS

Figure 3:
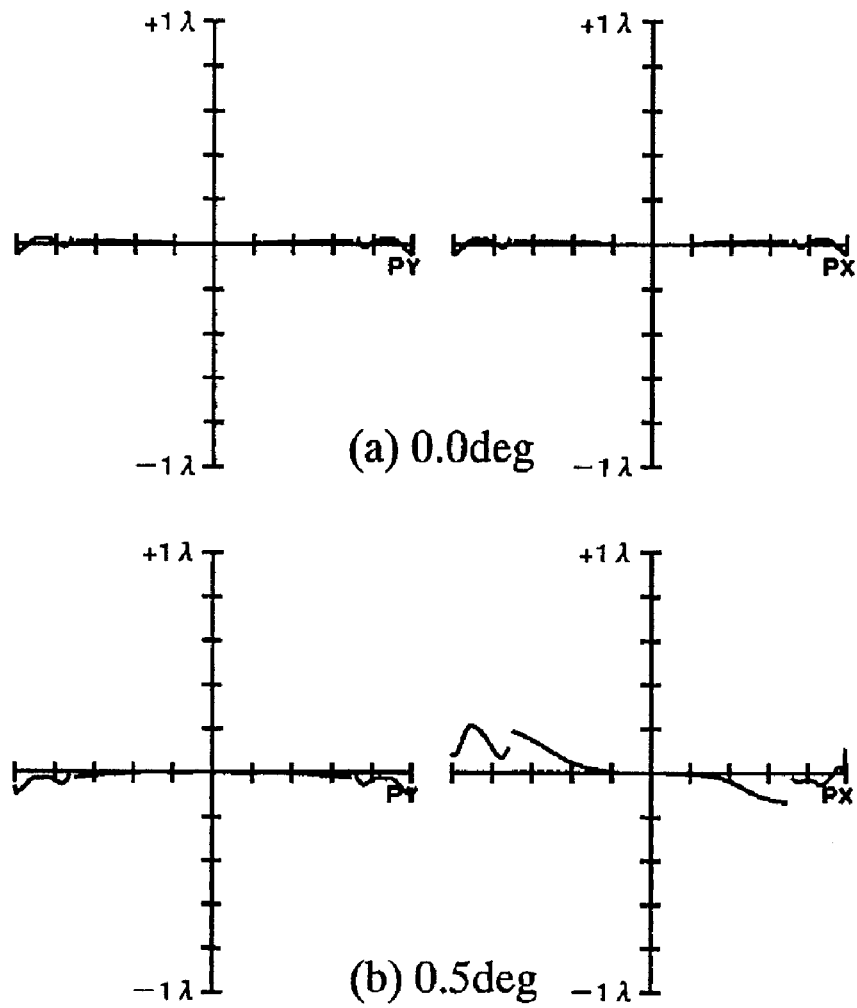
FIG. 3 is a wavefront aberration diagram obtained when laser light having a wavelength of 405 nm is focused on the BD 60.

| | |
|---|---|
| 1 | Objective lens |
| 1a | Reference lens |
| 1b | Close contact lens |
| 2 | Light source |
| 3 | Beam splitter |
| 4 | Collimator lens |
| 5 | Aperture restriction element |
| 6 | Light receiving element |
| 7 | Optical head |
| 11i | First face common area |
| 11o | First face dedicated area |
| 12i | Second face common area |
| 12o | Second face dedicated area |
| 13i | Third face common area |
| 13o | Third face dedicated area |
| 20 | Optical head |
| 30 | Optical disc apparatus |
| 35 | Optical disc driving section |
| 36 | Control section |
| 60 | BD |
| 70 | DVD |
| 80 | CD |

BEST MODE FOR CARRYING OUT THE INVENTION

Hereinafter, embodiments of an objective lens, an optical head incorporating the objective lens, and an optical disc apparatus using the optical head according to the present invention will be described with reference to the attached drawings.

In the following embodiments, a so-called three-wavelength compatible optical head will be described. The optical head is mounted on an optical disc apparatus (optical disc drive) and directs laser light of one of the three wavelengths to an optical disc in accordance with the type of the optical disc to record information to the optical disc or reproduce information from the optical disc.

The types of the optical discs are BD, DVD and CD. For simplicity of description, it is assumed that each optical disc has one information recording layer, hereinafter.

The protective substrate thickness of the BD is about 0.1 mm. The wavelength of the laser light used for information recording to the BD and/or information reproduction from the BD may be of any value included in the range of 350 nm to 450 nm with the reference being, for example, 405 nm. The numerical aperture (NA) of an objective lens 1 corresponding to the BD is 0.85.

The protective substrate thickness of the DVD is about 0.6 mm. The wavelength of the laser light corresponding to the DVD may be of any value included in the range of 600 nm to 700 nm with the reference being, for example, 655 nm. The numerical aperture (NA) of the objective lens 1 corresponding to the DVD is 0.60.

The protective substrate thickness of the CD is about 1.2 mm. The wavelength of the laser light corresponding to the CD may be of any value included in the range of 700 nm to 850 nm with the reference being, for example, 785 nm. The numerical aperture (NA) of the objective lens 1 corresponding to the CD is 0.47.

Hereinafter, the wavelengths of the laser light corresponding to the BD, DVD and CD will be specified by the respective reference wavelengths (405 nm, 655 nm and 785 nm).

With the optical head according to the present invention, laser light of any of the three wavelengths is directed from a common objective lens toward the optical disc. Therefore, the optical head adopts an objective lens capable of focusing the laser light of each wavelength on the information recording layer of each of the CD, DVD and BD.

The objective lens according to the present invention does not include a diffraction grating for diffracting the blue violet laser light to be directed toward the BD. The blue violet laser light is focused on the information recording layer of the BD only by the refractive effect of the objective lens. Since the diffraction grating is not provided, the transmission efficiency of the laser light is maintained to a level close to 100%. As a result, the laser power required for information recording or information reproduction can be suppressed. This is more effective for suppressing power consumption for information recording, which requires a higher power than information reproduction.

An objective lens including diffraction grating cannot improve the transmission efficiency with a good balance among all the wavelengths of light. The reason is that a diffraction efficiency closer to 100% cannot be obtained for all the wavelengths of light when the laser light of each wavelength is focused on the information recording layer of each of the CD, DVD and BD. It is possible to set the diffraction efficiency of BD at a level close to 100%, but this may result in, for example, the diffraction efficiency of DVD being decreased to 50% or lower. For a wavelength of a low diffraction efficiency, the amount of directed laser light is decreased, and the amount of laser light which is received after being reflected by the optical disc is further decreased. In order to guarantee a required amount of reflected light, the laser power needs to be set high. For this reason, an objective lens which does not use the diffraction grating is preferable.

In addition, the objective lens according to the present invention is capable of reducing a change in the chromatic aberration with respect to the change in the wavelength of the laser light. This effect is especially high for blue violet laser light. Therefore, even if the wavelength of the blue violet laser light is changed when a reproduction operation is switched to a recording operation, the objective lens according to the present invention is unlikely to be influenced by such a change. Thus, correct recording and reproduction operations can always be performed. Especially, it is highly possible that a failure in recording causes a fatal loss of data, and therefore the ability of performing a correct recording operation is very important. For this reason, the objective lens according to the present invention is preferable.

Embodiment 1

With Reference to FIG. 1 Through FIG. 6, an objective lens according to the present invention will be described in detail.

FIG. 1 shows a structure of an objective lens 1 according to this embodiment. The objective lens 1 is usable for an optical head for collecting laser light to an information recording layer of an optical disc to perform information recording or reproduction. To the information recording layer of each type of optical disc, the objective lens 1 collects the laser light of a wavelength corresponding to the optical disc.

The objective lens 1 includes a reference lens 1a which is a first lens and a close contact lens 1b which is a second lens.

As shown in FIG. 1, the reference lens 1a and the close contact lens 1b is each divided into a common area including an optical axis and a dedicated area outer to the common area. The "common area" is an area designed to allow the laser light of all the three wavelengths to pass in common. By contrast, the "dedicated area" is an area designed to allow only the laser light of a wavelength of 405 nm corresponding to the BD to pass. The laser light of a wavelength of 655 nm corresponding to the DVD and the laser light of a wavelength of 785 nm corresponding to the CD pass only the common area.

In consideration that the common area includes the optical axis, the common area is also referred to as the "central area", and the dedicated area located in a periphery of the central area is referred to also as the "peripheral area".

Next, the reference lens 1a and the close contact lens 1b will be described.

For the reference lens 1a, a first face which is a face on the light source side, and a second face which is a face on the optical disc side, are defined.

The first face of the reference lens 1a is divided into a common area 11i and a dedicated area 11o. The common area 11i and the dedicated area 11o are formed in different aspheric shapes as described later. The second face of the reference lens 1a is divided into a common area 12i and a dedicated area 12o. The common area 12i and the dedicated area 12o are formed in different aspheric shapes.

For the close contact lens 1b also, a face on the light source side and a face on the optical disc side are defined like for the reference lens 1a.

The face of the close contact lens 1b on the light source side and the second face of the reference lens 1a are in substantially close contact with each other by cementing or bonding. Therefore, these faces can be recognized as one face. Hereinafter, this face will be referred to also as the "close contact face". On the close contact face, the shape of the close contact lens 1b and the shape of the reference lens 1a substantially match each other. Thus, a common area and a dedicated area of the face of the close contact lens 1b on the light source side are also formed in different aspheric shapes.

The face of the close contact lens 1b on the optical disc side is divided into a common area 13i and a dedicated area 13o.

Hereinafter, the faces 11i and 11o of the reference lens 1a on the light source side will be referred to as the "first face" of the objective lens 1, the close contact face will be referred to as the "second face" of the objective lens 1, and the face of the close contact lens 1b on the optical disc side will be referred to as the "third face".

Next, a specific structure of the objective lens 1 according to this embodiment will be described.

Like an objective lens of a general optical head, the objective lens 1 acts as a convex lens as a whole. What should be noted is that the reference lens 1a acts as a convex lens whereas the close contact lens 1b has a function of a concave lens.

In this embodiment, the reference lens 1a is formed of K-VC79 (refractive index nd=1.610; Abbe constant vd=57.8). The close contact lens 1b is formed of polycarbonate (refractive index nd=1.584; Abbe constant vd=30.1). The refractive index nd represents a refractive index at d line (wavelength: 587.56 nm). The Abbe constant vd is a value represented using the refractive index (nd) of d line, the refractive index (nf) of F line (wavelength: 486.13 nm) and the refractive index (nc) of C line (wavelength: 656.27 nm). Specifically, vd=(nd−1)/(nf−nc).

Usually, a material, such as polycarbonate, which has a relatively small Abbe constant vd is not used as a material of the objective lens 1. The reason is that as the Abbe constant vd is decreased, the dispersion is increased, and thus the refractive index significantly varies in accordance with the wavelength.

Such a variance in the refractive index has an especially large influence on the position of focal point (best image point position) of laser light when the wavelength of the laser light having a short wavelength, such as blue violet laser light, changes. The wavelength of the laser light source changes because of various factors including recording/reproduction switching (i.e., change in the light emitting power) and a temperature change.

In the case where polycarbonate having a small Abbe constant is molded into the close contact lens 1b as a concave lens, the influence of a change in the best image point position, which is caused to the reference lens 1a as a convex lens when the wavelength is changed, can be counteracted by the close contact lens 1b. In addition, since polycarbonate is a resin material, the close contact lens 1b can be easily processed and formed by molding so as to closely contact the reference lens 1a. The present inventors found that as one of the materials usable for the close contact lens in this embodiment, polycarbonate which is easily moldable and has a very small Abbe constant among resin materials is preferable.

The aspheric shape of the first face 11i, 11o of the objective lens 1, the aspheric shape of the second face 12i, 12o, and the aspheric shape of the third face 13i, 13o are determined by the aspheric shape represented by the following expression 1.

$$Z=(1/R)h^2/[1+[1-(1+k)\cdot(1/R)^2h^2]^{1/2}]+\Sigma A_i h^{2i}$$ (expression 1)

In expression 1, h is the distance from the apex on the optical axis in a direction perpendicular to the optical axis, R is the radius of curvature, k is the conic constant, and Ai is the aspheric coefficient where i=0 to 10. Z is determined by h, R, k and Ai, and is the distance (sag) from the tangent plane of the apex in the optical axis direction. The curve determined by the value of Z gives the aspheric cross-sectional shape of each of the faces.

In expression 1, $A_0 h^0$, which is the zero-order term, i.e., $A_0$ represents the shift amount of sag in the optical axis direction. Although it is not common to use the zero-order term in expression 1 for giving an aspheric shape, the zero-order term is treated as one of the aspheric coefficients like the aspheric coefficients of the other terms.

As shown in FIG. 1, the faces forming the objective lens 1 are significantly different between the common area including the optical axis and the dedicated area which is in a periphery of the common area and does not include the optical axis.

The aspheric shapes of the first face 11i, the second face (close contact face) 12i and the third face 13i which form the common area are optimized for the laser light of all the three wavelengths. Namely, the radius of curvature R, the conical constant k and the aspheric coefficient Ai are determined such that the laser light of each wavelength is focused on the position of the information recording layer of the corresponding optical disc in the range of aperture defined by the common area. Thus, each aspheric shape given by expression 1 is determined.

By contrast, the aspheric shapes of the first face 11o, the second face (close contact face) 12o and the third face 13o which form the dedicated area are optimized only for the blue violet laser light of the shortest wavelength. Each aspheric shape given by expression 1 is determined by the radius of curvature R, the conical constant k and the aspheric coefficient Ai.

The objective lens 1 acts as a convex lens mainly because the reference lens 1a acts as a convex lens. By combining the reference lens 1a and the close contact lens 1b having a refractive index largely changing in accordance with the wavelength (namely, having a small Abbe constant), it is made possible to utilize the difference in the refractive index between the reference lens 1a and the close contact lens 1b at each wavelength to focus the laser light to the position of the information recording layer of the corresponding optical disc.

Tables 1 through 3 show the specifications of the objective lens 1.

TABLE 1

| Face No. | Radius of curvature | Surface separation | Material |
|---|---|---|---|
| 0 | ∞ | | Air |
| 1 | (R) | 2 | VC79 |
| 2 | (R) | 0.150 | Polycarbonate |
| 3 | (R) | 0.01 | Air |
| 4 | ∞ | Working distance | Air |
| 5 | ∞ | Protective substrate thickness | Polycarbonate |
| 6 | ∞ | (Information recording surface) | — |

TABLE 2

Aspheric coefficient of objective lens

| Face of objective lens | First face | | Second face | | Third face | |
|---|---|---|---|---|---|---|
| | Common area | Dedicated area | Common area | Dedicated area | Common area | Dedicated area |
| Diameter | 2.774 | — | 2.086 | — | 1.618 | — |
| R | 1.548512E+00 | 1.376261E+00 | −2.026930E+00 | 4.547950E−01 | −9.520042E+00 | −1.704763E+01 |
| k | −1.654605E−01 | 8.015858E−01 | 1.924557E+00 | −1.754227E+00 | −7.516247E+02 | 5.282765E+01 |
| A0 | 0.000000E+00 | −3.584534E−02 | 0.000000E+00 | −1.143532E+00 | 0.000000E+00 | −8.496583E−09 |
| A1 | 0.000000E+00 | 0.000000E+00 | 0.000000E+00 | 0.000000E+00 | 0.000000E+00 | 0.000000E+00 |
| A2 | −8.864383E−03 | −7.459868E−03 | −7.216000E−01 | −2.359697E−02 | −9.544410E−03 | 3.070657E−02 |
| A3 | −4.134868E−03 | −3.706669E−03 | 1.559395E+00 | −2.623339E−03 | 2.452363E−01 | −2.574589E−02 |
| A4 | 1.483088E−03 | 4.682480E−03 | −1.773165E+00 | −2.736591E−04 | −5.922066E−01 | 2.353358E−02 |
| A5 | −9.484171E−04 | 2.389666E−04 | 1.360102E+00 | −6.803417E−05 | 6.020023E−01 | −7.477367E−03 |
| A6 | −6.323733E−04 | −6.215415E−04 | −7.026189E−01 | −1.310028E−06 | 2.574411E−03 | −1.692319E−03 |
| A7 | 4.765987E−04 | 1.026057E−04 | 2.398149E−01 | −6.540504E−06 | −5.088738E−01 | 1.523062E−03 |
| A8 | −1.184838E−04 | −1.251071E−05 | −3.822624E−02 | −2.443003E−06 | 2.993372E−01 | −2.808388E−04 |
| A9 | 0.000000E+00 | 1.114157E−05 | 0.000000E+00 | 6.067579E−07 | 0.000000E+00 | 2.256459E−07 |
| A10 | 0.000000E+00 | −2.050830E−06 | 0.000000E+00 | 6.861612E−07 | 0.000000E+00 | 3.098310E−05 |

TABLE 3

Wavelength used, refractive index of material, interval

| | | | | |
|---|---|---|---|---|
| Wavelength | [nm] | 405 | 655 | 785 |
| Focal length | [mm] | 2.30 | 2.36 | 2.37 |
| Refractive index of first lens | | 1.62392 | 1.60297 | 1.59880 |
| Refractive index of second lens | | 1.61736 | 1.57849 | 1.57203 |
| Refractive index of protective layer | | 1.61736 | 1.57849 | 1.57203 |
| Numerical aperture | | 0.85 | 0.6 | 0.47 |
| Aperture diameter | [mm] | 3.91 | 2.73 | 2.23 |
| Object point distance | [mm] | ∞ | −85 | 70 |
| Working distance | [mm] | 1.008 | 0.669 | 0.442 |
| Protective layer thickness | [mm] | 0.0875 | 0.6 | 1.2 |

In Table 1, the face numbers are allocated as follows. Face number 0 represents the light source, face number 1 represents the first face 11i, 11o, face number 2 represents the second face 12i, 12o (close contact face), face number 3 represents the third face 13i, 13o, face number 4 represents the reference surface for the working distance, face number 5 represents the protective substrate surface of the optical disc, and face number 6 represents the information recording layer of the optical disc. Given as the surface separation and the material are the separation, and the material filling the separation, between the face represented by the respective face number and the face represented by the next face number. The working distance represents the distance between a part of the lens face which is closest to the optical disc and the optical disc. In Table 2, "E+02" to "E−07" respectively represent $10^2$ to $10^{-7}$.

FIGS. 2(a) through (c) each show a state of a light beam obtained when the laser light is focused on the information recording layer of a BD 60, a DVD 70 or a CD 80 using the objective lens 1 in this embodiment.

FIG. 2(a) shows a state of a light beam when the laser light having a wavelength of 405 nm is collected with a numeral aperture (NA) of 0.85 and focused on the BD 60. Similarly, FIG. 2(b) shows a state of a light beam when the laser light having a wavelength of 655 nm is collected with a numeral aperture (NA) of 0.60 and focused on the DVD 70. FIG. 2(c) shows a state of a light beam when the laser light having a wavelength of 785 nm is collected with a numeral aperture (NA) of 0.47 and focused on the CD 80. These figures all show the state where information recording or reproduction is being performed.

When the laser light is focused on the BD 60, the laser light is transmitted through both the dedicated area and the common area of the objective lens 1; whereas when the laser light is focused on the DVD 70 or the CD 80, the laser light is transmitted only through the common area of the objective lens 1.

FIG. 3 is a wavefront aberration diagram obtained when the laser light having a wavelength of 405 nm is focused on the BD 60, and shows the case when the angle of incidence is 0.0 deg ((a)) and the case when the angle of incidence is 0.5 deg ((b)). Similarly, FIG. 4 is a wavefront aberration diagram obtained when the laser light having a wavelength of 655 nm is focused on the DVD 70. FIG. 5 is a wavefront aberration diagram obtained when the laser light having a wavelength of 785 nm is focused on the CD 80.

In FIGS. 3 through 5, the PX axis and the PY axis are perpendicular to the optical axis, and the PX axis is perpendicular to the PY axis. The vertical axis represents the wavefront aberration, and the minimum value of the scale is −1λ and the maximum value of the scale is +1λ (λ: wavelength).

As shown in FIGS. 3 through 5, it has been confirmed that even when the angle of incidence of the laser light is varied from 0.0 deg to 0.5 deg, the values of the wavefront aberration are within ±1λ.

FIG. 6 is an RMS (Root Mean Square) wavefront aberration diagram in which the horizontal axis represents the angle of incidence. An RMS wavefront aberration represents a standard deviation (variation) between the ideal wave face front and the actual wave face. FIG. 6 shows the RMS wavefront aberration in the case where the light having a wavelength of 405 nm is focused on the BD 60, in the case where the light having a wavelength of 655 nm is focused on the DVD 70, and in the case where the light having a wavelength of 785 nm is focused on the CD 80.

It is confirmed from FIG. 6 that in any of the cases, all the values of the RMS wavefront aberration are equal or lower than the diffraction limit of 0.07λ (λ/14) when the angle of incidence is 0.0 deg to 0.5 deg. This is considered to show good performances of the objective lens 1.

In this embodiment, for focusing the laser light having a wavelength of 785 nm on the CD 80, the laser light is caused to be incident on the objective lens 1 as diverging light, so that the optical system acts as a finite system. By causing the laser light to be incident on the objective lens 1 as diverging light, the position at which the light outgoing from the objective lens 1 is converged is distanced from the objective lens 1. As a result, the working distance of the objective lens 1 to the CD 80 for focusing the laser light on the CD 80 can be increased. This working distance is generally preferably 0.30 mm or greater. Especially for a recordable CD, the working distance is preferably 0.40 mm or greater. The working distance of the objective lens in this embodiment is 0.44 mm or greater, which is sufficient.

For focusing the laser light having a wavelength of 655 nm on the DVD 70, the laser light is caused to be incident on the objective lens 1 as converging light, so that the optical system acts as a finite system. By causing the converging light to be incident on the objective lens 1, the wavefront aberration for the BD 60, the DVD 70 and the CD 80 in the common area can be reduced. For focusing the laser light on the DVD 70, even when the converging light is caused to be incident on the objective lens 1 as described above, a sufficiently large working distance can be guaranteed.

The wavelength of laser light varies in accordance with recording/reproduction switching, a temperature change and the like. Especially, there is a tendency that as the wavelength of the laser light having a shorter wavelength is varied, the refractive index of the material of the objective lens varies more significantly, and as a result, the best image point position changes.

With the objective lens 1 in this embodiment, even when the wavelength is changed by ±1 nm from 405 nm, the position of the best (minimum) RMS wavefront aberration at the wavelengths of 406 nm and 404 nm changes by merely about ±0.5 μm. Thus, the objective lens 1 is considered to have a good wavelength dispersion compensation ability.

The reason why the objective lens 1 has such a good wavelength dispersion compensation ability is the following. As described above, the objective lens 1 is arranged to act as a convex lens as a whole, but is formed by cementing or bonding the reference lens 1*a* as a convex lens together with the close contact lens 1*b* which provides a larger dispersion, i.e., has a smaller Abbe constant, than the reference lens 1*a* and is arranged to act as a concave lens. The change in the best image point position which occurs to the reference lens 1*a* as the convex lens along with a change in the wavelength is considered to be partially counteracted by the close contact lens 1*b* having a function of the concave lens.

The objective lens for performing recording to or reproduction from the BD has a numerical aperture (NA) as high as 0.85. Therefore, the face thereof on the light source side generally tends to have a larger curvature and thus to have a shape which is difficult to be processed. However, with the objective lens 1 in this embodiment, the maximum angle between the tangent plane contacting an arbitrary point on the first face 11*i*, 11*o* and the reference plane is 66.4 deg. Thus, a mold for producing an aspheric face of the objective lens 1 can be easily produced.

In the objective lens 1 in this embodiment, the reference lens 1*a* is formed of a glass material K-VC79, which provides superb optical performances. Therefore, the reference lens 1*a* is produced at low cost using a mold. The close contact lens 1*b* is formed of polycarbonate, which is a resin material.

The glass transition temperature of the reference lens 1*a* (K-VC79) is 507° C., whereas the glass transition temperature of the close contact lens 1*b* (polycarbonate) is 138° C. Therefore, the close contact lens 1*b* can be formed by molding so as to closely contact the reference lens 1*a*, which has been formed by molding.

As described above, the objective lens 1 in this embodiment exhibits good optical performances when any of the three types of light sources of wavelengths of 405 nm, 660 nm and 785 nm is used to perform recording to or reproduction from the corresponding optical disc. The above-mentioned optical head or optical disc apparatus using this objective lens can perform recording to or reproduction from the three types of optical discs of BD, DVD and CD in an excellent manner.

Embodiment 2

Next, with reference to FIGS. 7 through 12, an objective lens according to this embodiment will be described. The objective lens according to this embodiment is also usable for an optical head for collecting laser light to an information recording layer of each of three types of optical discs of BD, DVD and CD to perform information recording or reproduction.

Figure 7:
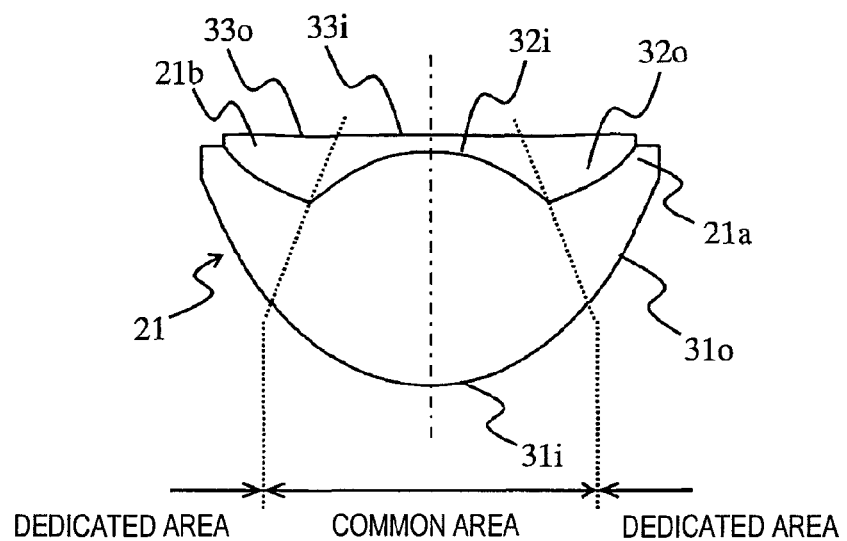
FIG. 7 is a view showing a structure of an objective lens 21 according to Embodiment 2.

FIG. 7 shows a structure of an objective lens 21 according to this embodiment. The objective lens 21 includes a reference lens 21*a* and a close contact lens 21*b*. The objective lens 21 according to this embodiment is different from the objective lens according to Embodiment 1 in the shape of the dedicated area. Hereinafter, this will be specifically described.

Each of the reference lens 21*a* and the close contact lens 21*b* includes an optical axis and is divided into a common area which allows the laser light of three wavelengths to be transmitted therethrough and a dedicated area outer to the common area. A first face, which is a face of the reference lens 21*a* on the light source side, is divided into a common area 31*i* and a dedicated area 31*o*. A second face, which is a face of the reference lens 21*a* on the optical disc side and also is a face of the close contact lens 21*b* on the light source side (referred to also as the "close contact face"), is divided into a common area 32*i* and a dedicated area 32*o*. A third face, which is a face of the close contact lens 21*b* on the optical disc side, is divided into a common area 33*i* and a dedicated area 33*o*.

The reference lens 21*a* and the close contact lens 21*b* are cemented or bonded in close contact, or substantially close contact, with each other at the second face 32*i*, 32*o*. Therefore, the face of the reference lens 21*a* which is cemented or bonded with the close contact lens 21*b*, and the face of the close contact lens 21b which is cemented or bonded with the reference lens 21a, have the same or substantially the same aspheric shape.

Next, a specific structure of the objective lens 21 will be described.

The materials of the reference lens 21a and the close contact lens 21b are respectively the same as those of the reference lens 1a and the close contact lens 1b in Embodiment 1.

The aspheric shape of the first face 31i, 31o, the aspheric shape of the second face 32i, 32o, and the aspheric shape of the third face 33i, 33o are determined by the aspheric shape represented by expression 1 mentioned above.

Tables 4 through 6 show the specifications of the objective lens 21.

TABLE 4

| Face No. | Radius of curvature | Surface separation | Material |
|---|---|---|---|
| 0 | ∞ | | Air |
| 1 | (R) | 2 | VC79 |
| 2 | (R) | 0.150 | Polycarbonate |
| 3 | (R) | 0.017 | Air |
| 4 | ∞ | Working distance | Air |
| 5 | ∞ | Protective substrate thickness | Polycarbonate |
| 6 | ∞ | (Information recording surface) | — |

TABLE 5

Aspheric coefficient of objective lens

| Face of objective lens | First face | | Second face | | Third face | |
|---|---|---|---|---|---|---|
| | Common area | Dedicated area | Common area | Dedicated area | Common area | Dedicated area |
| Diameter | 2.774 | — | 2.086 | — | 1.618 | — |
| R | 1.548512E+00 | 1.446703E+00 | −2.026930E+00 | 1.000000E+00 | −9.520042E+00 | −3.012030E+00 |
| k | −1.654605E−01 | −6.273052E−01 | 1.924597E+00 | −7.592092E+00 | −7.916247E+02 | 6.685375E+01 |
| A0 | 0.000000E+00 | −7.763331E−03 | 0.000000E+00 | −7.116175E−01 | 0.000000E+00 | 2.500000E−02 |
| A1 | 0.000000E+00 | 0.000000E+00 | 0.000000E+00 | 0.000000E+00 | 0.000000E+00 | 0.000000E+00 |
| A2 | 8.684363E−03 | −1.700869E−02 | −7.218000E−01 | −4.596527E−03 | −9.544410E−03 | 5.713619E−02 |
| A3 | −4.184598E−03 | 3.282913E−03 | 1.559396E+00 | 2.367212E−03 | 2.452353E−01 | −1.585581E−02 |
| A4 | 1.483086E−03 | 1.219354E−04 | −1.773165E+00 | 8.095243E−04 | −5.922066E−01 | −2.174502E−03 |
| A5 | −9.464171E−04 | 1.096169E−03 | 1.360102E+00 | 6.958631E−04 | 6.020023E−01 | 1.627213E−05 |
| A6 | −6.323733E−04 | −6.290656E−04 | −7.026189E−01 | −1.844286E−06 | 2.574411E−03 | −2.911066E−05 |
| A7 | 4.765987E−04 | 1.614547E−04 | 2.398149E−01 | 1.011363E−05 | −5.068738E−01 | −5.199048E−05 |
| A8 | −1.184538E−04 | −2.838656E−05 | 3.622624E−02 | 3.450467E−06 | 2.993372E−01 | −2.985503E−05 |
| A9 | 0.000000E+00 | 4.969884E−08 | 0.000000E+00 | 2.977346E−07 | 0.000000E+00 | 1.536247E−05 |
| A10 | 0.000000E+00 | 5.397537E−07 | 0.000000E+00 | 5.000788E−06 | 0.000000E+00 | −1.866927E−06 |

TABLE 6

Wavelength used, refractive index of material, interval

| | | | | |
|---|---|---|---|---|
| Wavelength | [nm] | 405 | 655 | 785 |
| Focal Length | [mm] | 2.30 | 2.36 | 2.37 |
| Refractive index of first lens | | 1.62392 | 1.60297 | 1.59880 |
| Refractive index of second lens | | 1.61736 | 1.57849 | 1.57203 |
| Refractive index of protective layer | | 1.61736 | 1.57849 | 1.57203 |
| Numerical aperture | | 0.85 | 0.60 | 0.47 |
| Aperture diameter | [mm] | 3.91 | 2.73 | 2.23 |
| Object point distance | [mm] | ∞ | −85 | 70 |
| Working distance | [mm] | 1.001 | 0.662 | 0.435 |
| Protective layer thickness | [mm] | 0.0875 | 0.6 | 1.2 |

In Table 4, the face numbers are allocated as follows. Face number 0 represents the light source, face number 1 represents the first face 31i, 31o, face number 2 represents the second face 32i, 32o (close contact face), face number 3 represents the third face 33i, 33o, face number 4 represents the reference surface for the working distance, face number 5 represents the protective substrate surface of the optical disc, and face number 6 represents the information recording layer of the optical disc. Given as the surface separation and the material are the separation, and the material filling the separation, between the face represented by the respective face number and the face represented by the next face number. In Table 5, "E+02" to "E−07" respectively represent $10^2$ to $10^{-7}$. A0, which is the zero-order term, is treated in the same manner as in Embodiment 1.

Table 4 is different from Table 1 in the numerical value of the surface separation of the third face 33i, 33o represented as face number 3. The surface separation of the objective lens in Embodiment 2 is 0.017 mm, which is longer by 7 μm than the surface separation of 0.01 mm of the objective lens in Embodiment 1.

Table 6 is different from Table 3 in the numerical value of the working distance. The working distance of the objective lens in Embodiment 2 is 0.662 mm, which is shorter by 7 μm than the working distance of 0.669 mm of the objective lens in Embodiment 1.

These differences are caused by the difference in the shape of the dedicated areas. It is understood by comparing Table 2 and Table 5 that the numerical values of the aspheric coefficients given to the dedicated areas are different. Due to the difference in the numerical values of the aspheric coefficients, the results of expression 1 are different, which causes the difference in the shape of the dedicated areas. As compared with the objective lens in Embodiment 1, the objective lens in Embodiment 2 has a longer surface separation by 7 μm and therefore a shorter working distance.

FIGS. 8(a) through (c) each show a state of a light beam obtained when the laser light is focused on the information recording layer of the BD 60, the DVD 70 or the CD 80 using the objective lens 21 in this embodiment.

Figure 8:
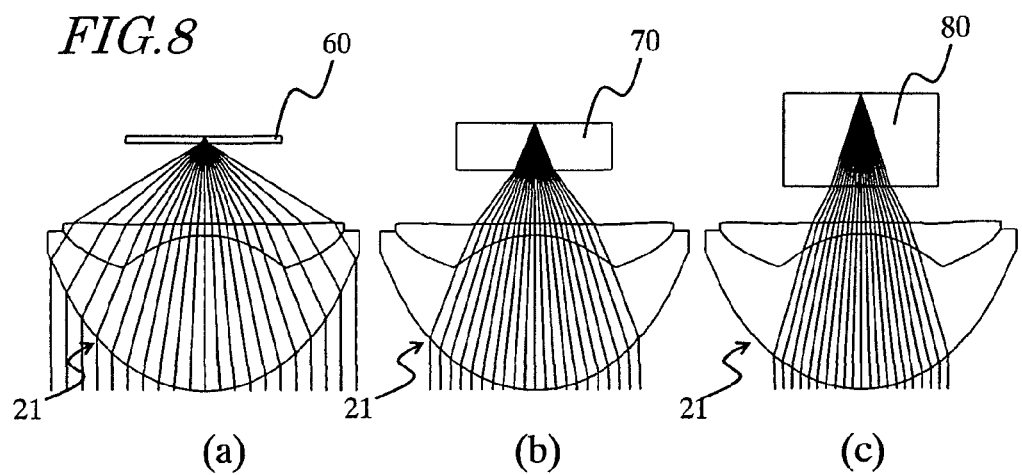
FIGS. 8(a) through (c) each show a state of a light beam when laser light is focused on an information recording layer of the BD 60, the DVD 70 or the CD 80 using the objective lens 21 in Embodiment 2.

FIG. 8(a) shows a state of a light beam when the laser light having a wavelength of 405 nm is collected with a numeral aperture (NA) of 0.85 and focused on the BD 60. Similarly, FIG. 8(b) shows a state of a light beam when the laser light having a wavelength of 655 nm is collected with a numeral aperture (NA) of 0.60 and focused on the DVD 70. FIG. 8(*c*) shows a state of a light beam when the laser light having a wavelength of 785 nm is collected with a numeral aperture (NA) of 0.47 and focused on the CD 80. These figures all show the state where information recording or reproduction is being performed.

When the laser light is focused on the BD 60, the laser light is transmitted through both the dedicated area and the common area of the objective lens 1; whereas when the laser light is focused on the DVD 70 or the CD 80, the laser light is transmitted only through the common area.

Figure 9:
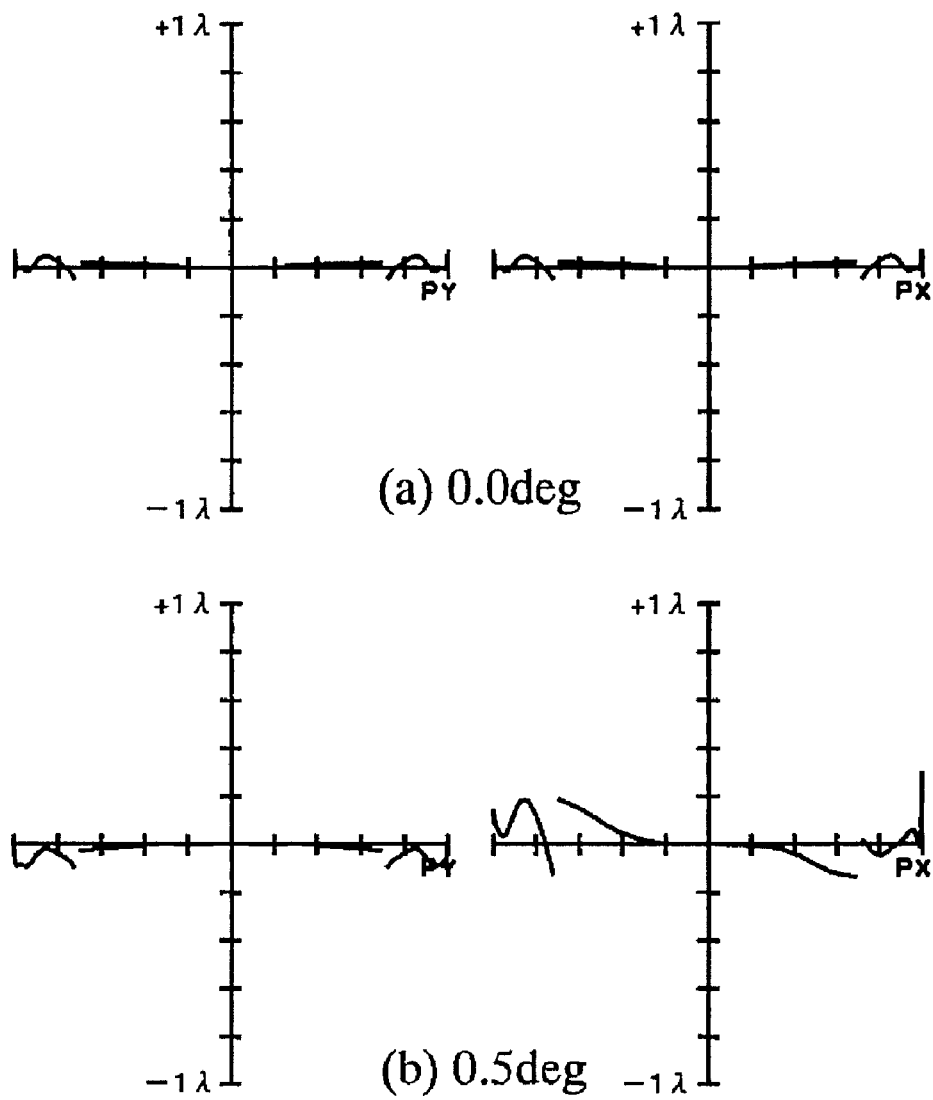
FIG. 9 is a wavefront aberration diagram obtained when the laser light having a wavelength of 405 nm is focused on the BD 60.
Figure 10:
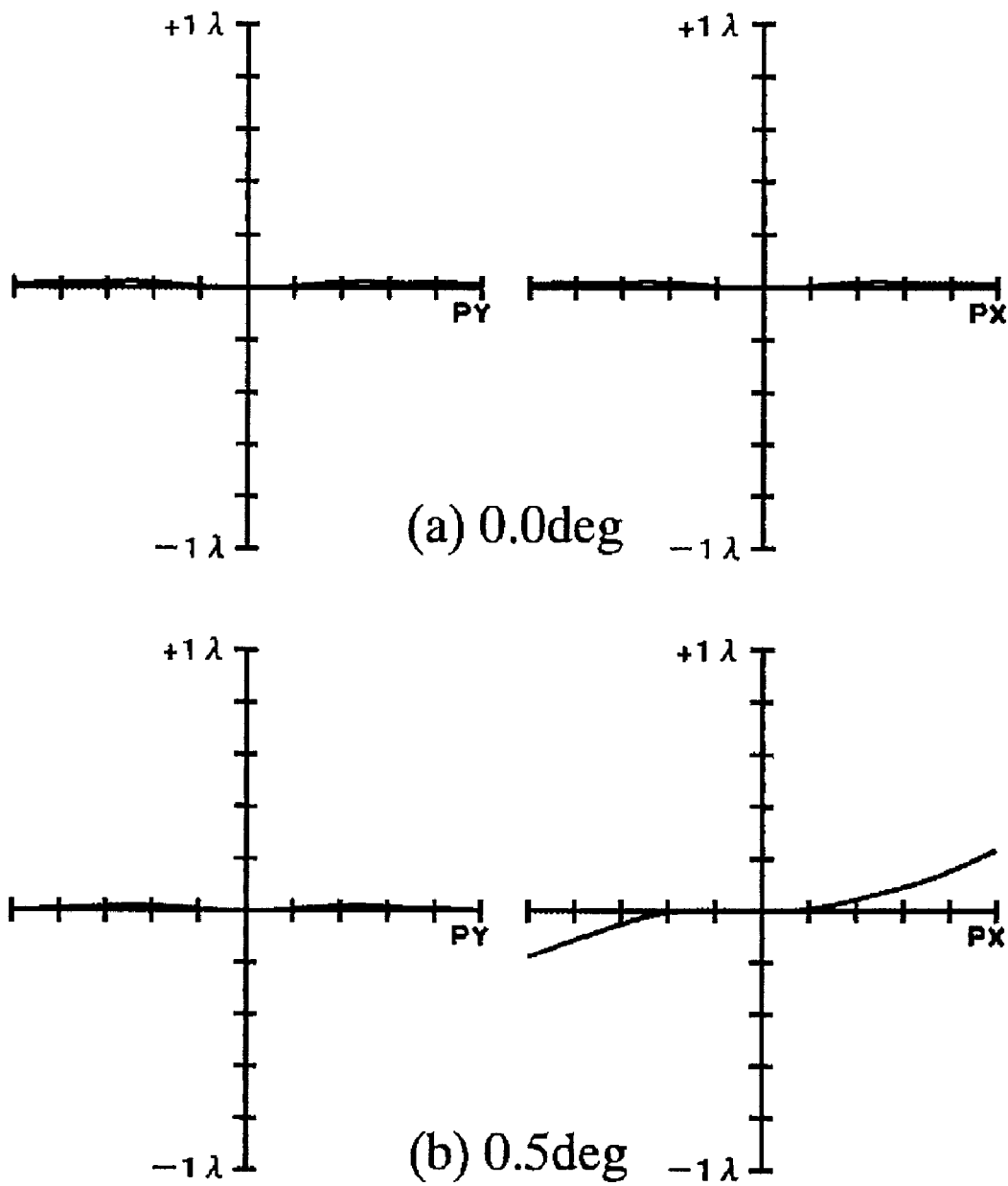
FIG. 10 is a wavefront aberration diagram obtained when the laser light having a wavelength of 655 nm is focused on the DVD BD 70.
Figure 11:
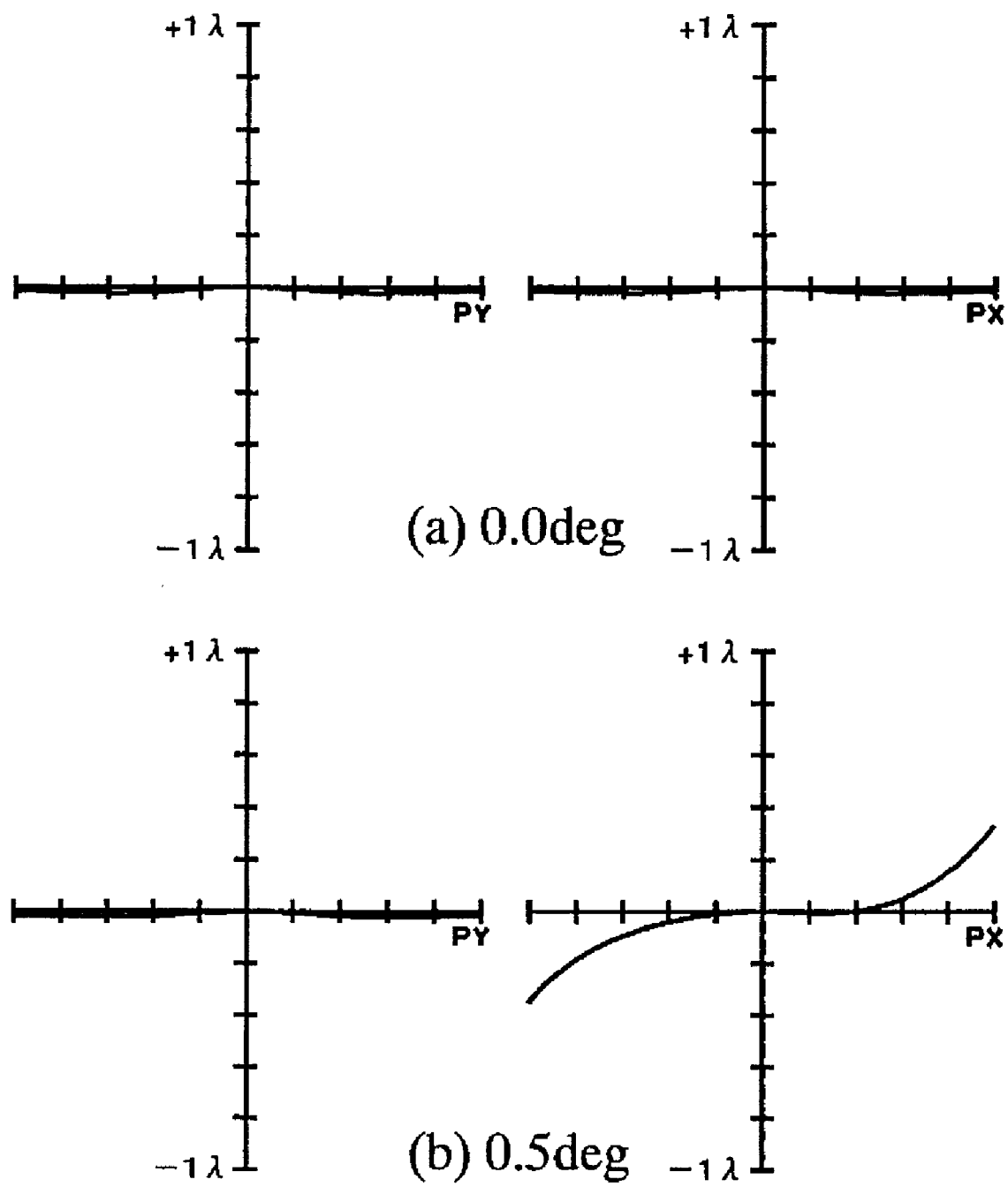
FIG. 11 is a wavefront aberration diagram obtained when the laser light having a wavelength of 785 nm is focused on the CD 80.

FIG. 9 is a wavefront aberration diagram obtained when the laser light having a wavelength of 405 nm is focused on the BD 60, and shows the case when the angle of incidence is 0.0 deg ((a)) and the case when the angle of incidence is 0.5 deg ((b)). Similarly, FIG. 10 is a wavefront aberration diagram obtained when the laser light having a wavelength of 655 nm is focused on the DVD 70. FIG. 11 is a wavefront aberration diagram obtained when the laser light having a wavelength of 785 nm is focused on the CD 80. FIGS. 9 through 11 show the aberrations in the same manner as in FIGS. 3 through 5.

As shown in FIGS. 9 through 11, it has been confirmed that even when the angle of incidence of the laser light is varied from 0.0 deg to 0.5 deg, the values of the wavefront aberration are within ±1λ.

Figure 12:
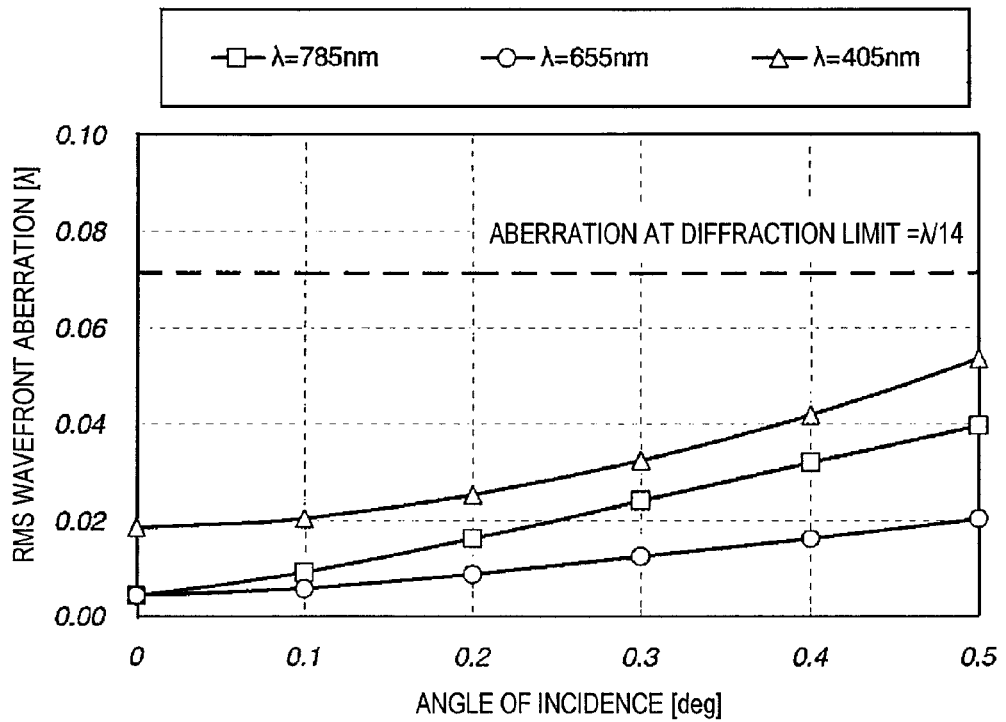
FIG. 12 is an RMS wavefront aberration diagram in which the horizontal axis represents the angle of incidence.

FIG. 12 is an RMS (Root Mean Square) wavefront aberration diagram in which the horizontal axis represents the angle of incidence. FIG. 12 shows the RMS wavefront aberration in the case where the light having a wavelength of 405 nm is focused on the BD 60, in the case where the light having a wavelength of 655 nm is focused on the DVD 70, and in the case where the light having a wavelength of 785 nm is focused on the CD 80.

It is confirmed from FIG. 12 that in any of the cases, all the values of the RMS wavefront aberration are equal or lower than the diffraction limit of 0.07λ (λ/14) when the angle of incidence is 0.0 deg to 0.5 deg. This is considered to show good performances of the objective lens 21.

In this embodiment also, for focusing the laser light having a wavelength of 785 nm on the CD 80, the laser light is caused to be incident on the objective lens 21 as diverging light. For focusing the laser light having a wavelength of 655 nm on the DVD 70, the laser light is caused to be incident on the objective lens 21 as converging light. In either case, the optical system acts as a finite system. As a result, the working distance obtained when the laser light is focused on the CD 80 using the objective lens 21 in this embodiment is 0.43 mm or greater, which is sufficient.

With the objective lens 21 in this embodiment, the position of the best (minimum) RMS wavefront aberration at wavelengths of 406 nm and 404 nm is different by about ±0.5 μm from that at 405 nm. This shows that the objective lens 21 has a good wavelength dispersion compensation ability.

With the objective lens 21 in this embodiment, the maximum angle between the tangent plane contacting an arbitrary point on the first face 31*i*, 31O and the reference plane is 65.6 deg. Thus, a mold for producing an aspheric face of the objective lens 21 can be easily produced.

In the objective lens 21 in this embodiment also, the reference lens 21*a* is formed of K-VC79 and the close contact lens 21*b* is formed of polycarbonate. Therefore, the close contact lens 21*b* can be formed by molding so as to closely contact the reference lens 21*a*, which has been formed by molding.

As described above, the objective lens 21 in this embodiment exhibits good optical performances when any of the three types of light sources of wavelengths of 405 nm, 660 nm and 785 nm is used to perform recording to or reproduction from the corresponding optical disc. The above-mentioned optical head or optical disc apparatus using this objective lens can perform recording to or reproduction from the three types of optical discs of BD, DVD and CD in an excellent manner.

In Embodiments 1 and 2, as the material of the reference lens 1*a* and the reference lens 21*a*, K-VC79 (nd=1.610; νd=57.8) is used, and as the material of the close contact lens 1*b* and the close contact lens 21*b*, polycarbonate (nd=1.584; νd=30.1) is used. The materials are not limited to these. As long as the following conditions are fulfilled, any materials are usable: the reference lens and the close contact lens are formed of different materials; and the materials fulfill the relationships of:

$$nd1 > nd2 \text{ and } \nu d1 > \nu d2 \qquad \text{(expression 2)}$$

where nd1 is the refractive index of the reference lens, νd1 is the Abbe constant of the reference lens, nd2 is the refractive index of the close contact lens, and νd2 is the Abbe constant of the close contact lens.

By combining such a refractive index and such an Abbe constant, the change in the best image point position (longitudinal chromatic aberration) caused to the reference lens, which is a convex lens, can be corrected in the opposite direction by the close contact lens having a function of a concave lens. Thus, a good wavelength dispersion compensation ability is obtained as described above.

The refractive index nd1 is preferably $$1.60 < nd1 < 1.85 \qquad \text{(expression 3).}$$

The refractive index nd2 is preferably $$1.45 < nd2 < 1.60 \qquad \text{(expression 4).}$$

The Abbe constant νd1 is preferably $$40 < \nu d1 < 60 \qquad \text{(expression 5).}$$

The Abbe constant νd2 is preferably $$20 < \nu d2 < 40 \qquad \text{(expression 6).}$$

By selecting such a refractive index and such an Abbe constant, a good wavelength dispersion compensation ability is obtained with a combination of a general glass material and a general resin material for optical uses.

It is preferable that the reference lens is formed of a glass material. Especially in order to extend the life of the mold used for the molding process so as to produce the reference lens more easily at lower cost, the glass transition temperature of the glass material is preferably 550° C. or lower. Specific materials preferable for the reference lens are glass materials for optical uses, for example, K-VC79, K-VC78, K-VC81 and K-VC89.

It is preferable that the close contact lens is formed of a resin material. A material which can contact the reference lens highly closely and which is superb in transmittance, light resistance and moisture resistance is preferable.

In order to be molded in close contact with the reference lens, the resin material needs to have a glass transition temperature which is lower than that of the glass material used for the reference lens. The glass transition temperature of general glass materials for optical uses is about 350° C. to 550° C. Specifically, the glass transition temperature of the above-mentioned glass materials for optical uses, i.e., K-VC79, K-VC78, K-VC81, K-VC89 and the like is about 500° C. Thus, the glass transition temperature of the resin material used for the close contact lens is preferably 300° C. or lower.

In the case where a close contact lens is produced by molding a resin material so as to be in close contact with the reference lens formed of a glass material, the positional alignment of the reference lens and the close contact lens at the contact face is not necessary.

An objective lens including a reference lens formed of a glass material and a close contact lens formed of another glass material has features of being highly superb in climate resistance and moisture resistance. The close contact lens may be formed by molding a glass material different from the glass material of the reference lens, as long as the glass transition temperatures of the two glass materials are different to some extent. In this case, the difference in the glass transition temperature is preferably 200° C. or greater. In the case where the reference lens and the close contact lens are formed of different types of glass materials, the reference lens and the close contact lens are preferably bonded with an adhesive.

The close contact lens may also be formed by molding an ultraviolet curable resin so as to be in contact with the reference lens in a so-called photopolymer method (2P method). In the case where the close contact lens is formed by the photopolymer method, the positional alignment of the reference lens and the close contact lens at the contact face is not necessary.

It is also possible to insert the reference lens and the close contact lens separately formed by molding into a prescribed holder and thus to hold the reference lens and the close contact lens in substantially close contact with each other. Evidently, the effect of the present invention is provided even with such a structure.

With the objective lenses 1 and 2 in Embodiments 1 and 2, all the effective areas of the first face, the second face (close contact face) and the third face include a common area (central effective area) including the optical axis of the lens and a dedicated area (peripheral effective area) not including the optical axis of the lens, and the common area and the dedicated area in each face have different aspheric shapes.

The present invention is not limited to this. For example, the lens effective area of at least one of the first through third faces may include a common area and a dedicated area having different aspheric shapes. Alternatively, lens effective area of at least one face may include three or more areas.

In the case where the effective area of the second face (close contact face) includes a common area and a dedicated area having different aspheric shapes, the following is possible. The angle between a tangent plane contacting an arbitrary point on the plane of the effective area of the second face and the reference plane, which is perpendicular to the optical axis, is represented by θ. The common area and the dedicated area can be constructed such that the value and the sign of θ are changed at the border between the common area and the dedicated area. With such a structure, the spherical aberration caused by the common area can be made significantly different from the spherical aberration caused by the dedicated area.

The "sign of θ" may be specifically defined as follows. For example, with the premise that a lens is a rotatable body centering around the optical axis, the "sign of θ" may be determined based on whether each of the following angles is clockwise or counterclockwise: in the lens cross-section (FIG. 1, etc.), the angle between the "tangent line" of the common area and the "reference line" representing the reference plane, and the angle between the "tangent line" of the dedicated area which extend while having the border "point" of the common area and the dedicated area therebetween, and the reference line.

Whether "the value and the sign of θ are changed" or not may be determined using other calculation methods. For example, an appropriate three-dimensional coordinate system including the objective lens is defined, and the following inner products are calculated: the inner product of the normal vector of the tangent plane at point "a" in the common area and normal vector C of the reference plane; and the inner product of the normal vector of the tangent plane at point "b" in the dedicated area close to point "a" and normal vector C of the reference plane. By comparing the absolute values of the inner products, it can be determined whether the value of θ is changed or not. By comparing the signs of the inner products, it can be determined whether the sign of the θ is changed or not.

For example, data recording to or data reproduction from the DVD 70 shown in FIG. 2(b) is performed only through the common area. Therefore, in general, an element or structure for restricting the aperture so as prevent the laser light from being incident on the dedicated area is necessary. However, according to the above-described structure, the laser light incident on the dedicated area generates a very large spherical aberration on the DVD 70 and thus does not form an optical spot. Thus, the element or structure for restricting the aperture is substantially not necessary.

By providing an optical step between the common area and the dedicated area in at least one of the first, second and third faces, the phase shift caused at the border between the common area and the dedicated area can be corrected.

In order to correct the aberration at the time of recording to or reproduction from the BD 60, the dedicated area of the first face may have a diffraction structure. This structure also provides an effect of further reducing the wavefront aberration at the time of recording to or reproduction from the BD 60.

The diffraction structure is preferably designed such that laser light of a prescribed wavelength (in the case of the objective lenses 1 and 21 in Embodiments 1 and 2, a wavelength of 405 nm) is diffracted at a diffraction efficiency of 80% or greater.

The objective lenses 1 and 21 in Embodiments 1 and 2 are described as being used in an optical system for performing information recording or reproduction by collecting laser light to an information recording layer of each of the three types of optical discs of BD, DVD and CD. The present invention is not limited to being used for BD.

The above description is given with an assumption that an optical disc has one information recording layer. Alternatively, an optical disc may have a plurality of information recording layers. In the case where there are a plurality of information recording layers, the "protective substrate layer thickness" described above means the thickness of a transparent layer existent between a surface of the optical disc on the laser light incidence side and the information recording layer which is a target of the information recording or reproduction. The transparent layer may include an information recording layer which is not a target of the information recording or reproduction.

Embodiment 3

Figure 13:
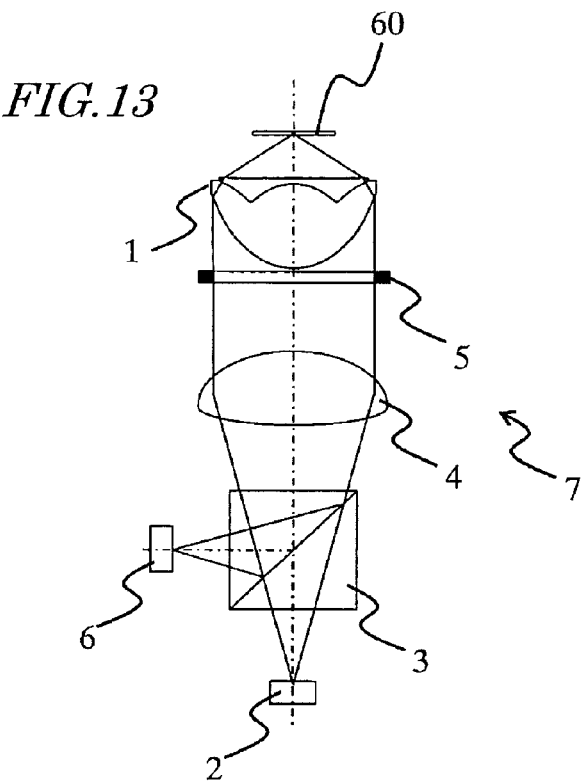
FIG. 13 is a view showing a state of an optical path in an optical head 7 in the case where the optical disc is the BD 60.
Figure 14:
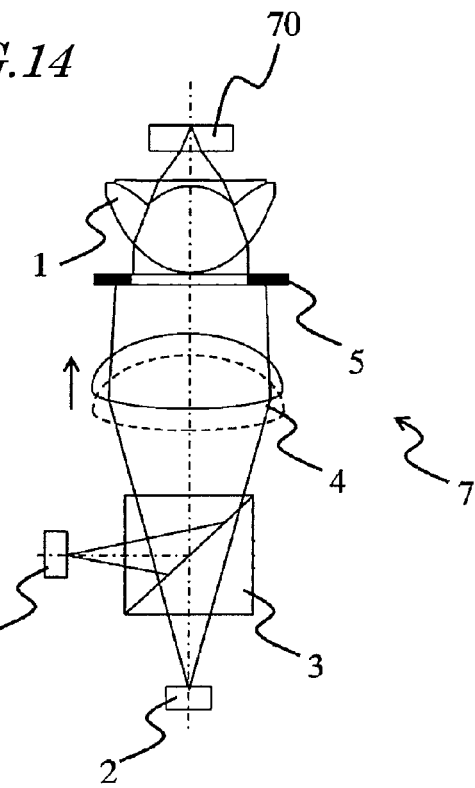
FIG. 14 is a view showing a state of an optical path in the optical head 7 in the case where the optical disc is the DVD 70.
Figure 15:
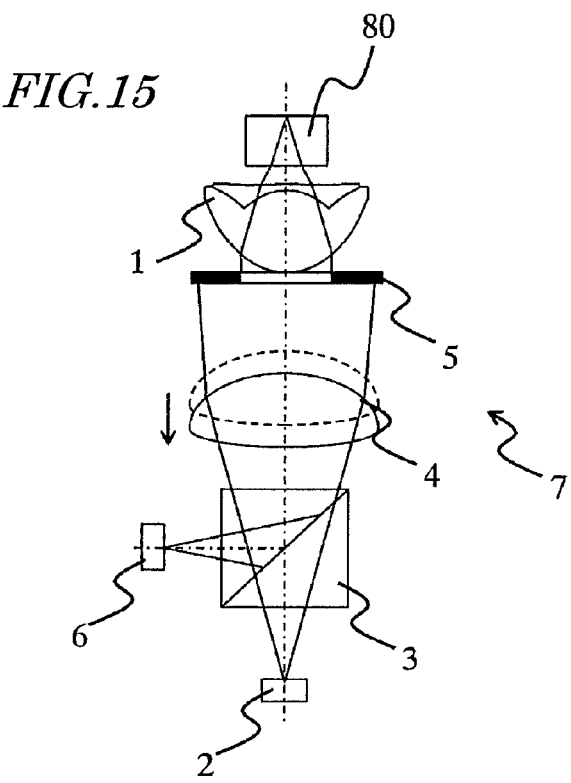
FIG. 15 is a view showing a state of an optical path in the optical head 7 in the case where the optical disc is the CD 80.

FIGS. 13 through 15 show schematic structures of an optical head 7 according to this embodiment. FIGS. 13 through 15 each show a state of an optical path in the optical head 7 where the optical disc is the BD 60, the DVD 70 or the CD 80.

The optical head 7 includes the objective lens 1, a light source 2, a beam splitter 3, a collimator lens 4, an aperture restriction element 5, and a light receiving element 6.

The objective lens 1 is an objective lens according to Embodiment 1.

The light source 2 is capable of emitting blue violet laser light having a wavelength of 405 nm, red laser light having a wavelength of 655 nm, and infrared laser light having a wavelength of 785 nm.

The aperture restriction element 5 has a function of changing the diameter of a light beam incident on the objective lens 1 in accordance with the wavelength of the light emitted by the light source. The reason why the aperture restriction element 5 is provided is that the numerical apertures used for information recording to or reproduction from the BD 60, the DVD 70 and the CD 80 is different. The aperture restriction element 5 includes a mechanical aperture, an optical aperture or the like.

An example of the mechanical aperture may be a plurality of plates each having an opening with a diameter corresponding to the respective numerical aperture. These plates are exchanged in accordance with the type of the optical disc. An example of the optical aperture may be wavelength-selective dichroic filter, dichroic prism or the like. The mechanical aperture and the optical aperture are merely exemplary. The present invention is not limited to these.

The aperture restriction element 5 restricts the numerical aperture based on a control signal for controlling the numerical aperture. The control signal is transmitted from an optical disc controller (described later) for determining which optical disc among the BD 60, the DVD 70 and the CD 80 is mounted. When the optical head is mounted on the optical disc apparatus, the optical disc controller (control section) is also provided on the optical disc apparatus.

As the beam splitter 3, the collimator lens 4 and the light receiving element 6, well known optical elements are usable.

Now, an operation of the optical head 7 for performing information recording to or reproduction from each of the BD 60, the DVD 70 and the CD 80 will be described.

Referring to FIG. 13, blue violet laser light having a wavelength of 405 nm emitted from the light source 2 is transmitted through the beam splitter 3, is converted to substantially parallel light by the collimator lens 4, and is restricted by the aperture restriction element 5 such that the numerical aperture (NA) is 0.85. Then, the blue violet laser light is collected as an optical spot by the objective lens 1 on the information recording layer of the BD 60 beyond the protective substrate. The laser light reflected by the information recording layer of the BD 60 is again transmitted through the objective lens 1, the aperture restriction element 5 and the collimator lens 4, is reflected by the beam splitter 3, and is guided to the light receiving element 6.

Similarly, referring to FIG. 14, red laser light having a wavelength of 655 nm emitted from the light source 2 is transmitted through the beam splitter 3, is converted to converging light by the collimator lens 4, and is restricted by the aperture restriction element 5 such that the numerical aperture (NA) is 0.60. Then, the red laser light is collected as an optical spot by the objective lens 1 on the information recording layer of the DVD 70 beyond the protective substrate. The laser light reflected by the information recording layer of the DVD 70 is again transmitted through the objective lens 1, the aperture restriction element 5 and the collimator lens 4, is reflected by the beam splitter 3, and is guided to the light receiving element 6.

As shown in FIG. 14, for performing recording to or reproduction from the DVD 70, the collimator lens 4 is moved closer to the objective lens 1 along the optical axis as compared with the position of the collimator lens 4 for performing recording to or reproduction from the BD 60 shown in FIG. 13. Thus, the light output from the collimator lens 4 is incident on the objective lens 1 as converging light, so that the laser light is collected on the information recording layer of the DVD 70.

In this embodiment, a driving mechanism (not shown) is provided for moving the collimator lens 4. The driving mechanism controls the movement of the collimator lens 4 based on a driving signal. The driving signal is output from the optical disc controller mentioned above. Based on the driving signal, the driving mechanism moves the collimator lens 4 in an optical axis direction to the position corresponding to the wavelength of the light which is being output. Thus, the position of the collimator lens 4 at the time of recording to or reproduction from the DVD 70 is moved closer to the objective lens 1 as compared with the position of the collimator lens 4 at the time of recording to or reproduction from the BD 60. The structure and operation of the driving mechanism will be described in the next embodiment, which is incorporated here as a description of the driving mechanism according to this embodiment.

Referring to FIG. 15, infrared laser light having a wavelength of 785 nm emitted from the light source 2 is transmitted through the beam splitter 3, is converted to diverging light by the collimator lens 4, and is restricted by the aperture restriction element 5 such that the numerical aperture (NA) is 0.47. Then, the infrared laser light is collected as an optical spot by the objective lens 1 on the information recording layer of the CD 80 beyond the protective substrate. The laser light reflected by the information recording layer of the CD 80 is again transmitted through the objective lens 1, the aperture restriction element 5 and the collimator lens 4, is reflected by the beam splitter 3, and is guided to the light receiving element 6.

As shown in FIG. 15, for performing recording to or reproduction from the CD 80, the collimator lens 4 is moved by the driving mechanism (not shown) closer to the light source 2 along the optical axis as compared with the position of the collimator lens 4 for performing recording to or reproduction from the BD 60 shown in FIG. 13. Thus, the light output from the collimator lens 4 is incident on the objective lens 1 as diverging light, so that the laser light is collected on the information recording layer of the CD 80.

The structure of moving the collimator lens along the optical axis for the convergence/divergence switching of the laser light is merely exemplary. As another example, the lens itself may be switched to another lens in accordance with the type of the optical disc which is a target of the recording or reproduction.

In the above, the optical head is described as including the objective lens 1 according to the embodiment. Instead of the objective lens 1, the objective lens 21 according to Embodiment 2 may be adopted.

As described in Embodiment 1, in the case where recording to or reproduction from the BD 60 is performed with the objective lens 1, when the wavelength is changed by ±1 nm from the central wavelength of 405 nm, the best image point position of the RMS wavefront aberration at the wavelengths changes by about ±0.5 μm. As understood from this, the objective lens 1 has a good wavelength dispersion compensation ability. In order to further improve the recording or reproduction performances, it is preferable to provide a chromatic aberration correction element for correcting a change in the best image point position caused by a change in the wavelength. As the chromatic aberration correction element, a general achromatic two-element lens or the like is usable.

In the above, the optical head 7 is described as emitting blue violet laser light having a wavelength of 405 nm, red laser light having a wavelength of 655 nm and infrared laser light having a wavelength of 785 nm from one light source 2. The present invention is not limited to this. For example, blue violet laser light, red laser light and infrared laser light may be respectively emitted from a plurality of light sources located at different positions. For example, a structure in which the light source 2 emits only blue violet laser light and another light source (not shown) emit red laser light and infrared laser light may be conceived. The red laser light and the infrared laser light, or the blue violet laser light, may be guided to the collimator lens 4 by an optical element such as a half mirror or the like. Needless to say, three light sources for respectively emitting the laser light of the three wavelengths may be provided.

The wavelengths of the laser light are described as being 405 nm, 655 nm and 785 nm, but these values may not be fixed. As described at the beginning of this embodiment, any wavelength in the prescribed ranges is usable.

In this embodiment, the light receiving element 6 and the light source 2 are located at different positions. For example, the light source 2 and the light receiving element 6 may be located at the same position. It is not absolutely necessary that one light receiving element 6 should receive all the laser light. For example, three light receiving elements (not shown) may be provided for respectively receiving blue violet laser light, red laser light and infrared laser light. A light receiving element for receiving the laser light of two among the three wavelengths, and a light receiving element for receiving the laser light of the remaining wavelength, may be provided.

The combination of the optical discs is not limited to the combination of the BD 60, the DVD 70 and the CD 80. A structure may be provided which is compatible to different types of optical discs, for example, another high density optical disc (protective substrate thickness: about 0.6 mm, NA: 0.65) instead of the BD, the DVD (protective substrate thickness: about 0.6 mm, NA: 0.60) and the CD (protective substrate thickness: about 1.2 mm, NA: 0.47).

Embodiment 4

Figure 16:
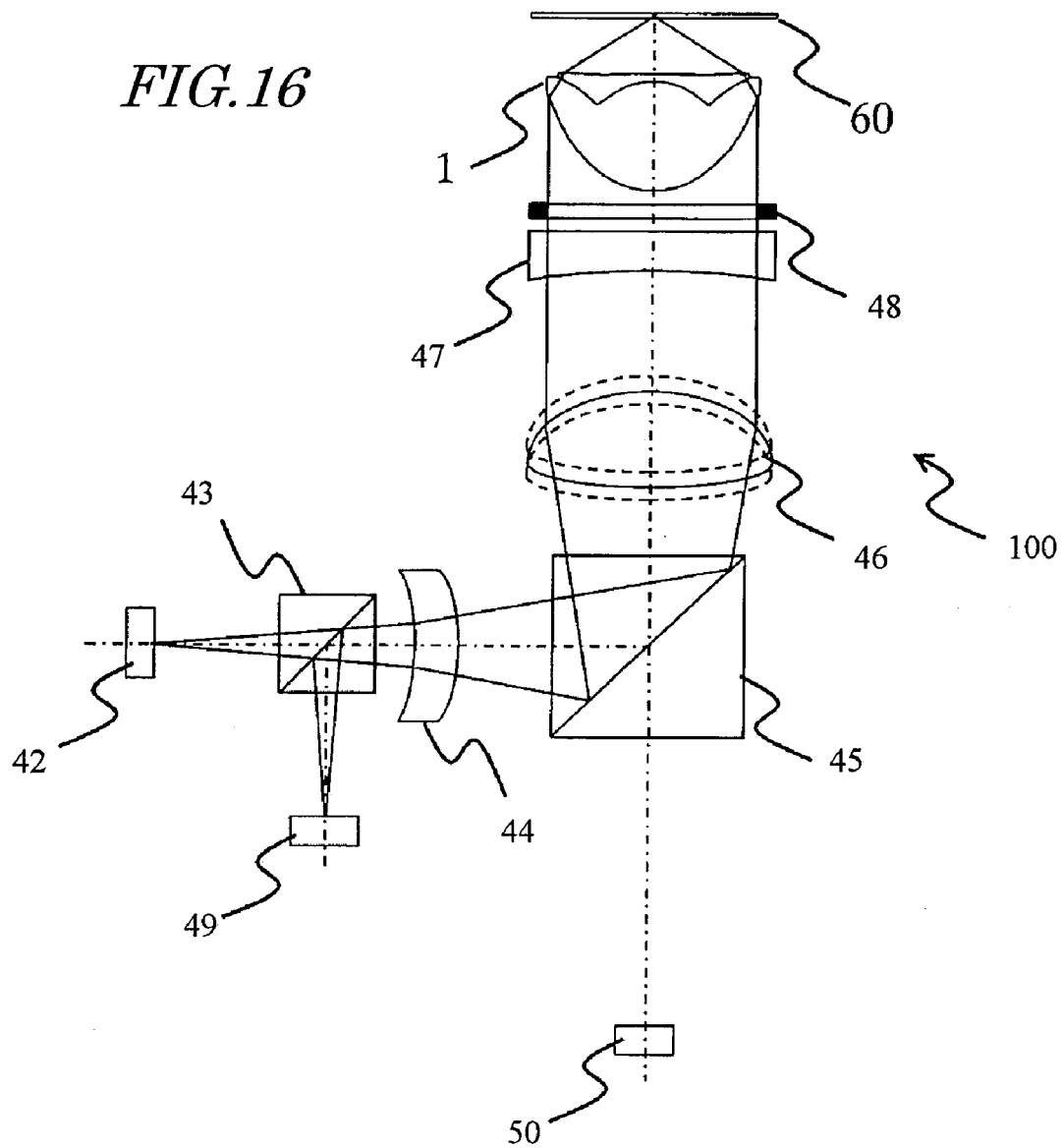
FIG. 16 is a view showing a state of an optical path in an optical head 100 in the case where the optical disc is the BD 60.
Figure 17:
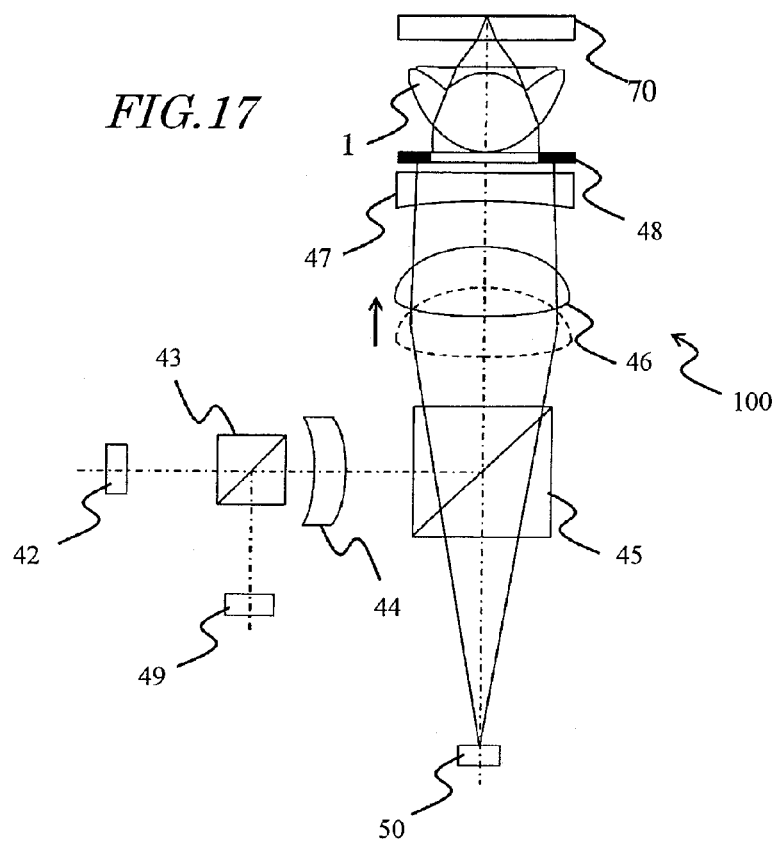
FIG. 17 is a view showing a state of an optical path in the optical head 100 in the case where the optical disc is the DVD 70.
Figure 18:
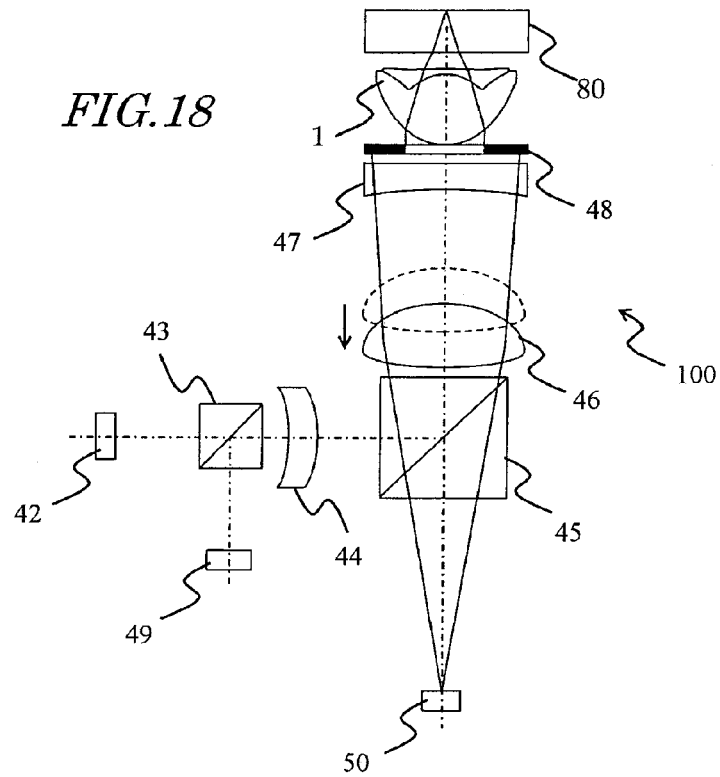
FIG. 18 is a view showing a state of an optical path in the optical head 100 in the case where the optical disc is the CD 80.

FIGS. 16 through 18 show schematic structures of an optical head 100 according to this embodiment. FIGS. 16 through 18 each show a state of an optical path in the optical head 100 where the optical disc is the BD 60, the DVD 70 and or CD 80.

The optical head 100 includes the objective lens 1, a light source 42, a beam splitter 43, a relay lens 44, a dichroic prism 45, a collimator lens 46, a chromatic aberration correction element 47, an aperture restriction element 48, a light receiving element 49, and a light receiving/emitting integrated element 50.

The objective lens 1 is an objective lens according to Embodiment 1.

The light source 42 emits blue violet laser light.

The aperture restriction element 48 has a function of changing the diameter of a light beam incident on the objective lens 1 in accordance with the wavelength of the light emitted by the light source. The structure of the aperture restriction element 48 is the same as that of the aperture restriction element 5 (Embodiment 3) shown in FIGS. 13 through 15.

The light receiving element 49 receives blue violet laser light.

The light receiving/emitting integrated element 50 emits and receives red laser light and infrared laser light. The dichroic prism 45 reflects light of a prescribed wavelength or shorter. The "prescribed wavelength or shorter" includes the wavelength of 405 nm of blue violet laser light but does not include the wavelength of 655 nm of red laser light or the wavelength of 785 nm of infrared laser light. Namely, the "prescribed" is set to a value between the wavelength of 405 nm of blue violet laser light and the wavelength of 655 nm of red laser light.

The protective substrate thickness of the BD 60 is, on principle, about 0.1 mm, but the protective substrate thickness of a two-layer BD is about 0.1 mm or about 0.075 mm.

Next, an operation of the optical head 7 for performing information recording to or reproduction from each of the BD 60, the DVD 70 and the CD 80 will be described.

Referring to FIG. 16, an operation of the optical head 100 for performing information recording to or reproduction from the BD 60 will be described. Blue violet laser light having a wavelength of 405 nm emitted from the light source 42 is transmitted through the beam splitter 43 and the relay lens 44. The blue violet laser light is reflected by the dichroic prism 45, then is converted to substantially parallel light by the collimator lens 46, is transmitted through the chromatic aberration correction element 47, and is restricted by the aperture restriction element 48 such that the numerical aperture (NA) is 0.85. Then, the blue violet laser light is collected as an optical spot by the objective lens 1 on the information recording layer of the BD 60 beyond the protective substrate.

The laser light reflected by the information recording layer of the BD 60 is again transmitted through the objective lens 1, the aperture restriction element 48, the chromatic aberration correction element 47 and the collimator lens 46, is reflected by the dichroic prism 45, is transmitted through the relay lens 44, then is reflected by the beam splitter 43, and is guided to the light receiving element 49.

For performing recording to or reproduction from the BD 60, substantially parallel light is incident on the objective lens 1. The "substantially parallel light" means completely parallel light in the case where the protective substrate thickness is about 0.0875 mm. Such a design is provided such that the spherical aberration is substantially zero at the information recording layer of the BD 60. In the case where the protective substrate thickness is about 0.1 mm, slightly diverging light is incident on the objective lens 1, whereas in the case where the protective substrate thickness is about 0.075 mm, slightly converging light is incident on the objective lens 1. Thus, in both cases, the spherical aberration can be substantially zero.

Similarly, referring to FIG. 17, red laser light having a wavelength of 655 nm emitted from the light receiving/emitting integrated element 50 is transmitted through the dichroic prism 45, is converted to converging light by the collimator lens 46 moved toward the objective lens 1, is transmitted through the chromatic aberration correction element 47, and is restricted by the aperture restriction element 48 such that the numerical aperture (NA) is 0.60. Then, the red laser light is collected as an optical spot by the objective lens 1 on the information recording layer of the DVD 70 beyond the protective substrate. The laser light reflected by the information recording layer of the DVD 70 is again transmitted through the objective lens 1, the aperture restriction element 48, the chromatic aberration correction element 47, the collimator lens 4 and the dichroic prism 45, and is returned to and received by the light receiving/emitting integrated element 50.

Referring to FIG. 18, infrared laser light having a wavelength of 785 nm emitted from the light receiving/emitting integrated element 50 is transmitted through the dichroic prism 45, is converted to diverging light by the collimator lens 46 moved toward the light receiving/emitting integrated element 50, is transmitted through the chromatic aberration correction element 47, and is restricted by the aperture restriction element 48 such that the numerical aperture (NA) is 0.47.

Then, the infrared laser light is collected as an optical spot by the objective lens 1 on the information recording layer of the CD 80 beyond the protective substrate. The laser light reflected by the information recording layer of the CD 80 is again transmitted through the objective lens 1, the aperture restriction element 48, the chromatic aberration correction element 47, the collimator lens 4 and the dichroic prism 45, and is returned to and received by the light receiving/emitting integrated element 50.

For performing recording to or reproduction from the DVD 70, converging light having an object point distance of −85 mm needs to be incident on the objective lens 1; whereas for performing recording to or reproduction from the CD 80, diverging light having an object point distance of +70 mm needs to be incident on the objective lens 1.

Next, with reference to FIGS. 19 and 20, a structure of the collimator lens 46 in this embodiment and elements in the vicinity thereof will be described in detail.

Figure 19:
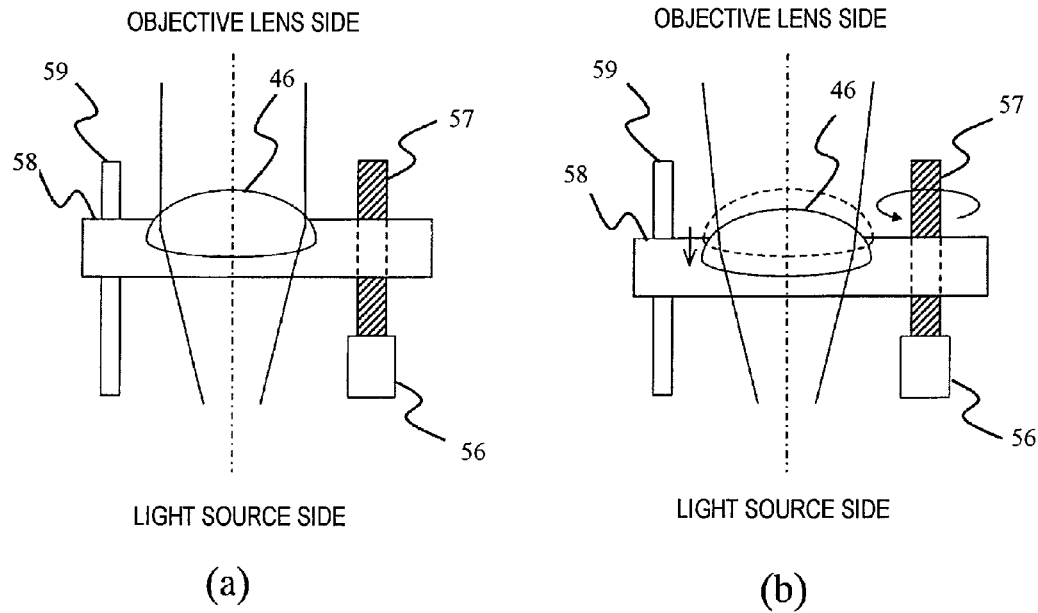
FIGS. 19(a) and (b) each show a schematic structure of a collimator lens 46 and a driving mechanism for driving the collimator lens 46 in an optical axis direction.

FIGS. 19(*a*) and (*b*) each show a schematic structure of the collimator lens 46 and a driving mechanism for driving the collimator lens 46 in an optical axis direction. In these figures, the light is expanded differently in accordance with the position of the collimator lens 46.

The driving mechanism includes a stepping motor 56, a screw shaft 57, a lens holder 58 and a guide 59.

As shown in FIG. 19(*b*), the stepping motor 56 is driven to rotate the screw shaft 57, which moves the collimator lens 46 and the lens holder 58 holding the collimator lens 46 in the optical axis direction along the guide 59.

When the stepping motor 56 is used, the position of the collimator lens 46 in the optical axis direction does not need to be monitored. The reason is that the stepping motor rotates at a prescribed stepping unit when being given a pulse signal, and therefore the rotation angle can be accurately controlled by the number of times the pulse signal is given. Accordingly, even without using a positional sensor or the like, the collimator lens 46 can be accurately controlled to be at an arbitrary position in the optical axis direction based on the relationship between the number of times the pulse signal is given and the moving distance. Use of the stepping motor 56 provides an advantage that a monitoring structure is not necessary and thus the system can be simplified.

Alternatively, the collimator lens 46 may be moved in the optical axis direction by an actuator driven by a magnetic circuit, a piezoelectric element or other structures instead of the stepping motor 56. The actuator driven by a magnetic circuit or a piezoelectric element has a small driving section and has an advantage of being suitable to reduce the size of the optical head.

Figure 20:
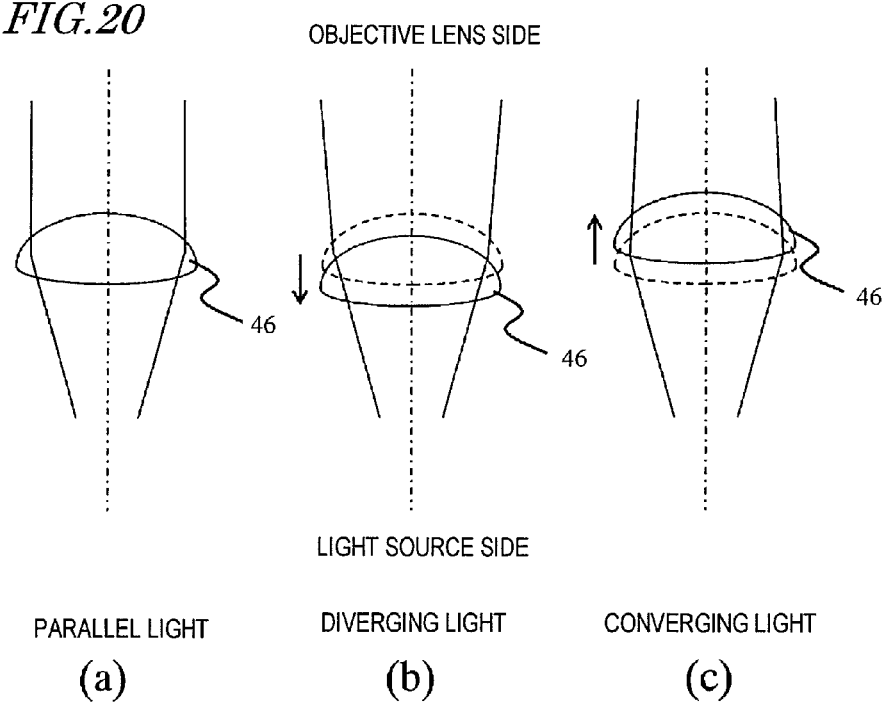
FIG. 20 shows states of a light beam when the collimator lens 46 is driven in the optical axis direction.

FIG. 20 shows states of a light beam when the collimator 46 is driven in the optical axis direction. The spherical aberration caused by a difference in the protective substrate thickness of the BD 60 varies the degree of divergence or convergence of the light incident on the objective lens 1. This can be corrected by causing a spherical aberration of an opposite polarity to the spherical aberration caused by the difference in the protective substrate thickness.

The state shown in FIG. 20(*a*) where the light outgoing from the collimator lens 6 is substantially parallel light is set as a reference state. When, for example, the collimator lens 46 is moved to the light source side from the reference state as shown in FIG. 20(*b*), the light outgoing from the collimator lens 46 is diverging light. Thus, the spherical aberration caused when the transparent substrate of the BD 60 is thickened can be corrected.

By contrast, when the collimator lens 46 is moved to the objective lens side as shown in FIG. 20(*c*), the light outgoing from the collimator lens 46 is converging light. Thus, the spherical aberration caused when the transparent substrate of the BD 60 is thinned can be corrected.

Next, an operation of moving the collimator lens 46 in the optical axis direction to perform the divergence/convergence switching of the laser light will be described in detail.

Figure 21:
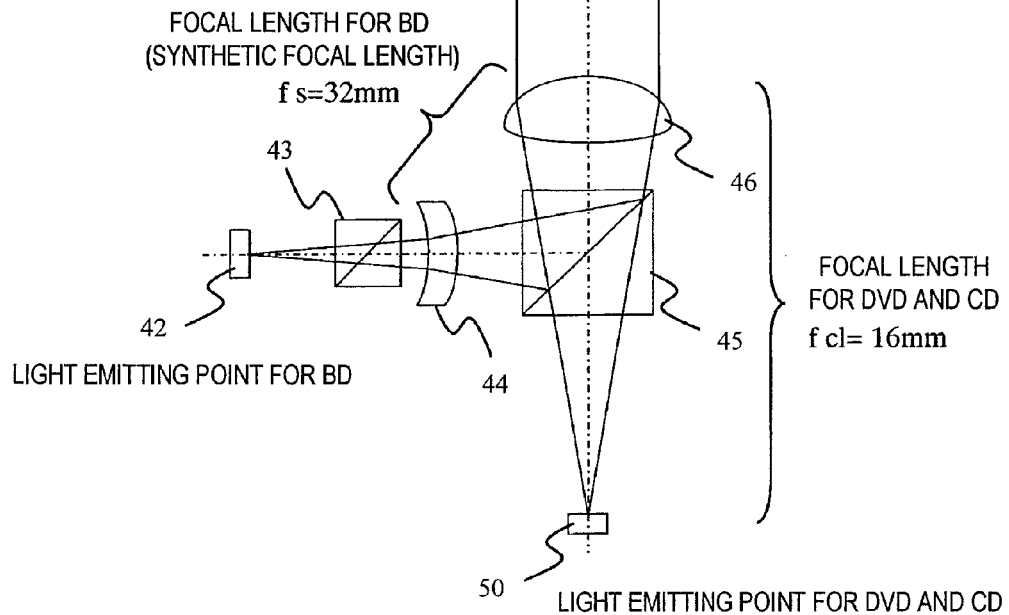
FIG. 21 is a view showing the relationship between the focal length of the collimator lens 46 when receiving blue violet laser light from the BD 60 and the focal length of the collimator lens 46 when receiving red laser light/infrared laser light from the DVD 70/CD 80.

FIG. 21 shows the relationship between the focal length of the collimator lens 46 when receiving blue violet laser light from the BD 60 and the focal length of the collimator lens 46 when receiving red laser light/infrared laser light from the DVD 70/CD 80.

As shown in FIG. 21, focal length fcl of the collimator lens 46 in this embodiment is 16 mm, and the magnification of the optical system of the DVD 70 and the CD 80 (optical magnification: focal length fcl of the collimator lens/focal length fol of the objective lens=16.0 mm/2.36 mm) is about 6.8. This optical magnification is determined from the viewpoint of guaranteeing the light utilization efficiency and the rim intensity for performing recording to or reproduction from the DVD 70 or the CD 80.

focal length frl of the relay lens 44 is −12 mm (negative), and the distance d (converted to air) between the collimator lens 46 and the relay lens 44 is 10 mm. At this point, synthetic focal length fs of the collimator lens 46 and the relay lens 44 is obtained from expression 7.

$$fs = fcl \times frl / (fcl + frl - d) \qquad \text{(expression 7)}$$

From expression 7, synthetic focal length fs is 32 mm. Namely, the optical magnification of the BD 60 (synthetic focal length fs/focal length fol of the objective lens=32.0 mm/2.3 mm) is about 13.9. This optical magnification is determined from the viewpoint of guaranteeing the light utilization efficiency and the rim intensity for performing recording to or reproduction from the BD 60.

As described in this embodiment, by locating the relay lens 44 on the opposite side to the collimator lens 46 with the dichroic prism 5 being interposed therebetween, the optical magnification for performing recording to or reproduction from the BD 60 and the optical magnification for performing recording to or reproduction from the DVD 70 or the CD 80 can be set to prescribed values, respectively.

For example, in this embodiment, the optical magnification for the BD 60 is determined so as to guarantee the required rim intensity while increasing the light utilization efficiency. By contrast, the optical magnification for the DVD 70 and the CD 80 is determined in compliance with the specifications of the light receiving/emitting integrated element 50, which is in wide use for optical heads capable of performing recording to or reproduction from DVDs.

The focal length s of the collimator lens 46 and the relay lens 44 are thus determined. The light emitting point of the light source 42 may be set to a position which is 32.0 mm (converted to air) away from the principal point of a synthetic lens of the collimator lens 46 and the relay lens 44 when the collimator lens 46 is at a reference position. The "reference position" is the position of the collimator lens 46 at which the blue violet laser light emitted by the light source 42 becomes parallel light by the collimator lens 46.

Figure 22:
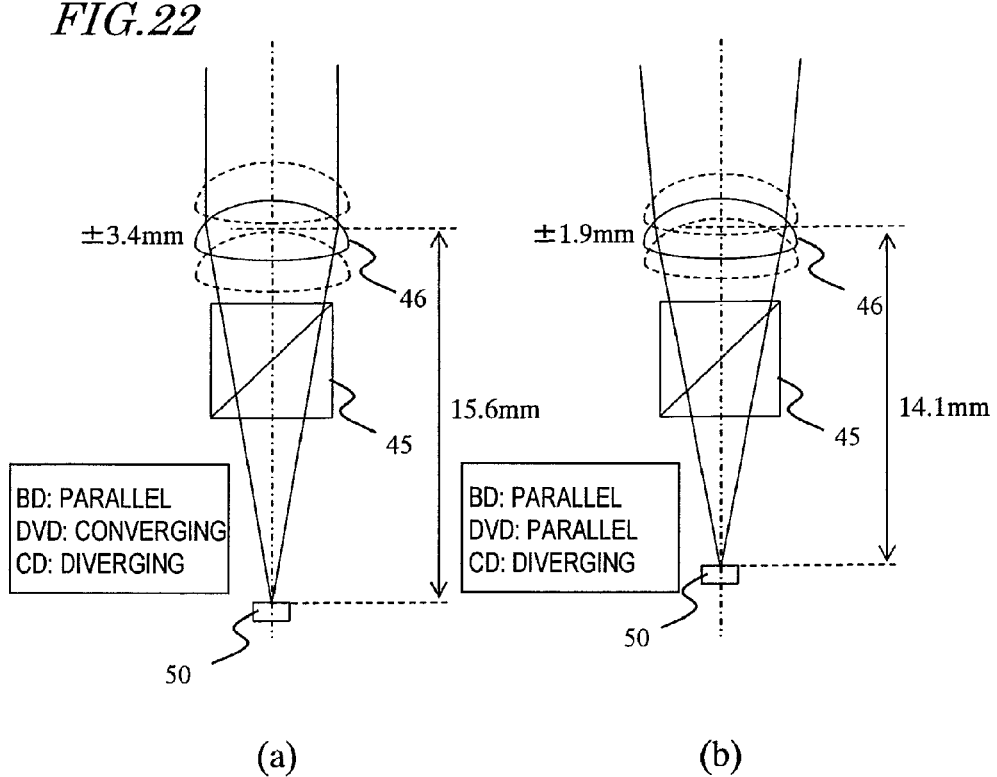
FIGS. 22(a) and (b) each show a position of a light emitting point of a light receiving/emitting integrated element 50.

The light emitting point of the light receiving/emitting integrated element 50 may be set to a position which is 15.6 mm (converted to air) away from the principal point of the collimator lens 46 when the collimator lens 46 is at the above-mentioned reference position as shown in FIG. 22(*a*).

At this point, the distance, by which the collimator lens 46 moves in the optical axis direction for correcting the spherical aberration caused when the protective substrate thickness of the BD 60 varies in the range of 0.060 mm to 0.115 mm centered around 0.0875 mm, is ±1.0 mm, the range including the variance of the optical disc.

Moving distance L1 of the collimator lens 46 toward the objective lens 1 for performing recording to or reproduction from the DVD 70 (FIG. 17) (i.e., the distance at which the laser light output from the collimator lens 46 is converted into converging light having an object point distance of −85 mm), and moving distance L2 of the collimator lens 46 toward the light receiving/emitting integrated element 50 for performing recording to or reproduction from the CD 80 (FIG. 18) (i.e., the distance at which the laser light output from the collimator lens 46 is converted into diverging light having an object point distance of +70 mm), are both 3.4 mm. These distances are obtained as a result of calculations performed with an assumption that the collimator lens 46 and the relay lens 44 are both a paraxial lens.

As described above, with the optical structure in this embodiment, the collimator lens 46 movable in the optical axis direction, which is originally used for correcting the spherical aberration of the BD 60, is also used for an optical system of the DVD 70 and the CD 80. Thus, the angle of incidence (diverging/converging degree) of the light beam incident on the objective lens 1 can be switched. Therefore, the light emitting point of the red laser light for performing recording to or reproduction from the DVD 70 and the light emitting point of the infrared laser light for performing recording to or reproduction from the CD 80 can be matched to each other, even when the angle of the light beam incident on the objective lens 1 (object point position) is different among these two cases. Thus, a light source capable of emitting laser light of two wavelengths can be used. Since the light emitting point of the red laser light and the light emitting point of the infrared laser light are matched to each other, the receiving elements for receiving the respective laser light can be integrated with each other. Namely, the light receiving/emitting integrated element 50 for two wavelengths as in this embodiment can be used to simplify the structure of the optical system.

A light receiving/emitting integrated element for emitting both red laser light for performing recording to or reproduction from the DVD 70 and infrared laser light for performing recording to or reproduction from the CD 80, and also receiving the light reflected by the DVD 70 and the light reflected by the CD 80, is widely used for optical heads capable of performing recording to or reproduction from DVDs. The light receiving/emitting integrated element is available at low cost. Therefore, enlarging the movable range of the collimator lens 46 to converge or diverge the laser light is very effective to construct an optical head at low cost.

In this embodiment, the optical head is designed using an objective lens which provides a good aberration performance when the blue violet laser light for performing recording to or reproduction from the BD 60 is incident on the objective lens 1 in the state of substantially parallel light, the red laser light for performing recording to or reproduction from the DVD 70 is incident on the objective lens 1 in the state of converging light, and the infrared laser light for performing recording to or reproduction from the CD 80 is incident on the objective lens 1 in the state of diverging light. Whether the light is parallel, converging or diverging when being incident on the objective lens for performing recording to or reproduction from the BD 60, the DVD 70 or the CD 80 is not limited to the above. The reason is that the state of the light when the light is incident on the objective lens depends on what type of objective lens is designed.

For example, it is assumed that an objective lens 1 is designed which causes red laser light for performing recording to or reproduction from the BD 60 and the DVD 70 to be incident on the objective lens 1 in the state of substantially parallel light and which causes infrared laser light for performing recording to or reproduction from the CD 80 to be incident on the objective lens 1 in the state of diverging light. Assuming that for performing recording to or reproduction from the CD 80, diverging light having an object point distance of +70 mm needs to be incident, the light emitting point of the light receiving/emitting integrated element 50 may be located, as shown in FIG. 22(b), at a position which is 14.1 mm (converted to air) away from the principal point of the collimator lens 46 when the collimator lens 46 is at the reference position. In this case, distance L1' by which the collimator lens 46 is moved toward the objective lens 1 for performing recording to or reproduction from the DVD 70, and distance L2' by which the collimator lens 46 is moved toward the light receiving/emitting integrated element 50 for performing recording to or reproduction from the CD 80, are both 1.9 mm.

Similarly, it is assumed that an objective lens 1 is designed which causes blue violet light for performing recording to or reproduction from the BD 60 to be incident on the objective lens 1 in the state of substantially parallel light and which causes infrared laser light for performing recording to or reproduction from the DVD 70 and the CD 80 to be incident on the objective lens 1 in the state of diverging light. In this case, the light emitting point of the light receiving/emitting integrated element 50 is located at a position which has a shorter distance, than the distance shown in FIG. 22(b), from the principal point of the collimator lens 46 when the collimator lens 46 is at the reference position.

It may be conceivable to design an objective lens which provides a good aberration performance when infrared laser light for performing recording to or reproduction from the CD 80 is incident on the objective lens in the state of substantially parallel light. However, in the case where the laser light is incident on an objective lens in the state of substantially parallel light or converging light, the position at which the light outgoing from the objective lens is converged is excessively close to the objective lens. As a result, as compared with the case where the laser light is incident on an objective lens in the state of diverging light as described above regarding this embodiment, the working distance (WD) from the objective lens to the CD 80 for performing recording to or reproduction from the CD 80 is shortened. For a recordable CD, the working distance is desirably 0.40 mm or longer. In the above case, however, the working distance may be occasionally shorter than 0.40 mm. As a result, an inconvenience that, for example, the objective lens contacts the disc occurs. Therefore, as described in this embodiment, the infrared laser light for performing recording to or reproduction from the CD 80 is preferably incident on the objective lens 1 in the state of diverging light.

As another example, it may be possible to design an objective lens which provides a good aberration performance when blue violet laser light for performing recording to or reproduction from the BD 60 is incident on the objective lens in the state of converging light or diverging light. However, in the case where an optical disc, such as a BD, for which recording or reproduction is performed using a light source of a short wavelength and an objective lens having a high numerical aperture, the blue violet laser light for performing recording to or reproduction from the BD 60 is preferably incident on the objective lens 1 in the state of substantially parallel light from the viewpoint of guaranteeing a good oblique spherical aberration performance or the like when the objective lens moves or the like.

The numerical aperture (NA) of the objective lens required for performing recording to or reproduction from the DVD 70 is lower than the numerical aperture (NA) of the objective lens required for performing recording to or reproduction from the BD 60. Therefore, even if converging or diverging light is incident on the objective lens, it is easier to provide a sufficient oblique spherical aberration performance. Even if converging light is incident on the objective lens, a sufficient working distance is easily obtained.

For the above-described reasons, it is preferable to construct an optical structure such that the blue violet laser light for performing recording to or reproduction from the BD 60 is incident on the objective lens in the state of substantially parallel light, the infrared laser light for performing recording to or reproduction from the CD 80 is incident on the objective lens in the state of diverging light, and red light for performing recording to or reproduction from the DVD 70 is incident on the objective lens in the state of substantially parallel light, diverging light or converging light.

In the above examples, in order to adjust such that the laser light to be incident on the objective lens is in a diverging state or a converging state (i.e., in order to convert the laser light to light of a preferable state), the collimator lens 46 is moved in the optical axis direction. Alternatively, other means is usable.

For example, the lens may be formed of at least one refractive index distribution variable material so that the focal length of the lens can be varied by applying an electric field, a magnetic field or heat to the refractive index distribution variable material and thus changing the refractive index distribution thereof.

Figure 23:
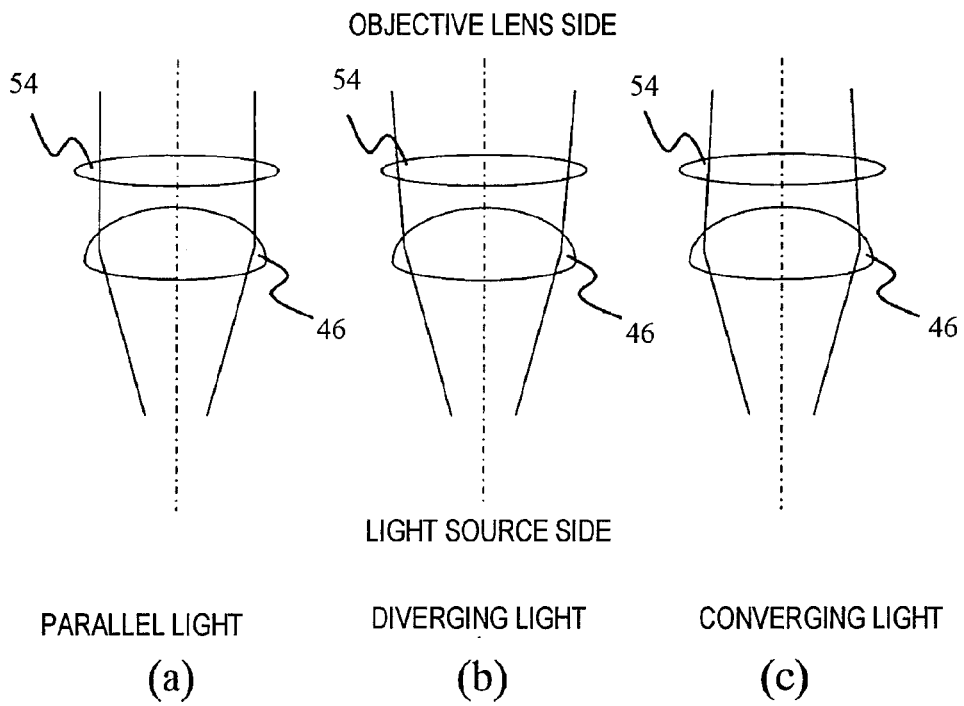
FIGS. 23(a) through (c) each show an example in which a refractive index distribution variable material 54 is provided on the objective lens side of the collimator lens 46.

For example, FIGS. 23(a) through (c) each show an example in which a refractive index distribution variable material 54 is provided on the objective lens side of the collimator lens 46. As shown in FIGS. 23(a) through (c), the collimator lens 46 of a general glass material and the refractive index distribution variable lens 54 may be combined together. In this case, under certain conditions, laser light emitted by the light source is transmitted through the collimator lens 46 to be substantially parallel light, then is converted into a desired diverging or converging state when being transmitted through the refractive index distribution variable lens 54 and is incident on the objective lens.

Alternatively, the lens may be formed of a plurality of types of non-miscible liquids having different refractive indices instead of the refractive index distribution variable lens 54. Application of a voltage corresponding to the wavelength of the laser light can vary the curvature of the interface between the non-miscible liquids. In this manner, the degree of divergence or convergence of the laser light (i.e., the focal length of the lens) may be varied.

Such a focal length variable lens may be put on the optical path as a lens separate from the collimator lens 46 as shown in FIGS. 23(a) through (c), or may be provided with a function of the collimator lens 46 from the viewpoint of reducing the size or the cost of the optical head. Conversion of the laser light into diverging light or converging light using a focal length variable lens has an advantage of reducing the size of the entire system because the driving section is not provided, as compared with the method of moving the collimator lens in the optical axis direction.

As described in the above embodiments, the wavelength of laser light emitted from the light source varies by, for example, the switching from the reproduction operation to the recording operation (by the switching of the light emitting power) or by a change in the ambient temperature. As the wavelength of the laser light is shorter, the influence exerted by a change in the best image point position is larger. The best image point position is changed by a change in the refractive index of the material of the objective lens, which is caused when wavelength is changed.

With the objective lens 1 in this embodiment, the position of the best (minimum) RMS wavefront aberration at wavelengths of 406 nm and 404 nm is different by about ±0.5 μm from that at 405 nm. For a recordable high density optical disc, it is preferable to provide a chromatic aberration correction element for correcting a change in the best image point position caused by a change in the wavelength, in order to improve the recording or reproduction performances.

Figure 24:
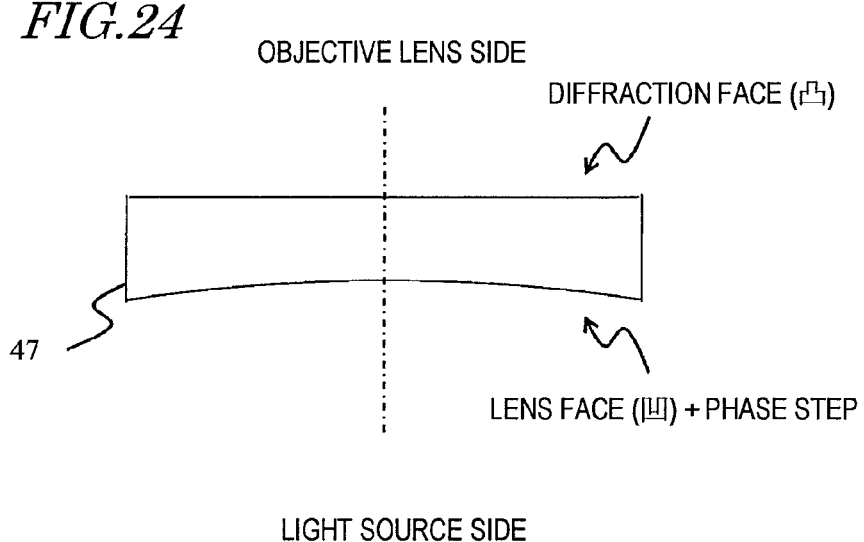
FIG. 24 is a view showing an example of a chromatic aberration correction element of a diffraction type.

For example, FIG. 24 shows an example of the chromatic aberration correction element 47 of a diffraction type. The chromatic aberration correction element 47 has a refraction face having a concave lens power and directed toward the incidence side (light source side) and a diffraction face having a convex lens power and directed toward the outgoing side (objective lens side).

The chromatic aberration correction element 47 has equal concave power and convex power at the reference wavelength of 405 nm of the blue violet laser light, and thus acts as an afocal lens. When the wavelength of the laser light is longer, the diffraction angle at the diffraction face is increased to improve the convex power. Thus, the chromatic aberration correction element 47 acts as a lens for outputting converging light when parallel light is incident thereon. By contrast, when the wavelength of the laser light is shorter, the diffraction angle at the diffraction face is decreased to improve the concave power. Thus, the chromatic aberration correction element 47 acts as a lens for outputting diverging light when parallel light is incident thereon. This acts so as to counteract the change in the best image point position caused to the objective lens 1.

Where only the function of correcting a chromatic aberration is considered, a general two-element achromatic lens may also be usable instead of such a diffraction type chromatic correction element.

FIGS. 25(a) through (d) show wavefront aberration diagrams when recording to or reproduction from the BD 60 is performed. The PX axis represents an axis perpendicular to the optical axis. The vertical axis represents the wavefront aberration, and the minimum value of the scale is −1λ and the maximum value of the scale is +1λ.

Figure 25:
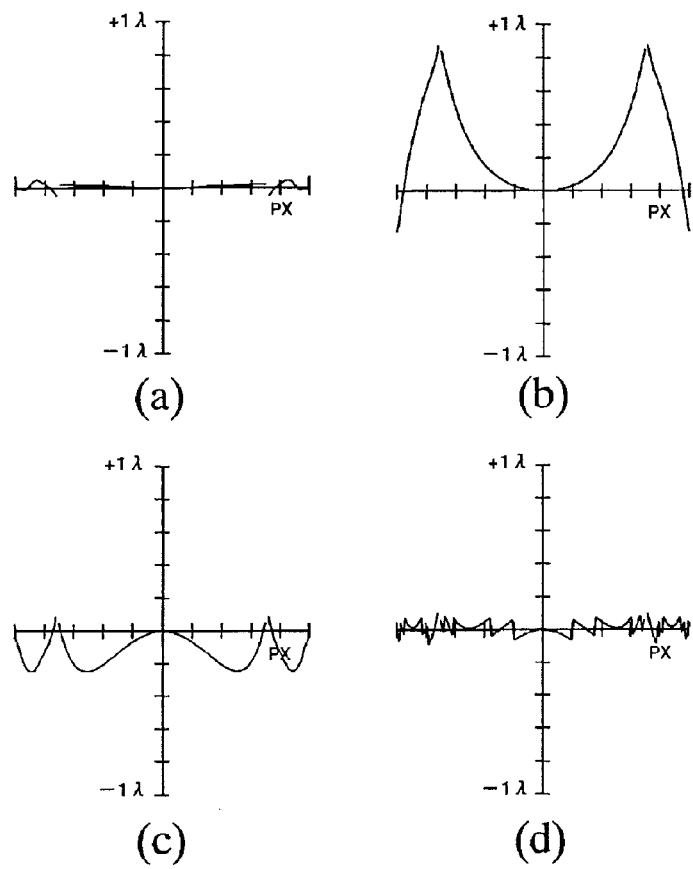
FIGS. 25(a) through (d) are each a wavefront aberration diagram obtained when recording to or reproduction from the BD 60 is performed.

FIG. 25(a) is a wavefront aberration diagram obtained when recording to or reproduction from the BD 60 (substrate thickness: about 0.0875 mm) is performed using laser light having a wavelength of 405 nm, which is the designing wavelength. FIG. 25(a) shows good characteristics.

FIG. 25(b) is a wavefront aberration diagram obtained when recording to or reproduction from the BD 60 is performed using laser light having a wavelength of 410 nm, which is deviated from the designing wavelength. From FIG. 25(b), it is understood that in addition to the three-order spherical aberration, a higher-order spherical aberration occurs. The three-order spherical aberration can be corrected as shown in FIG. 25(c) by moving the collimator lens 6 toward the light source by about 0.6 mm and thus causing the light to be incident on the objective lens 1 in the state of diverging light.

However, the five- or higher-order spherical aberration remaining in FIG. 25(c) cannot be corrected by moving the collimator lens 6.

The high-order spherical aberration caused along with the wavelength change can be corrected using a phase step.

As represented in FIG. 24 as "lens face (⊔)+phase step", a phase step is formed in the concave lens face of the chromatic aberration correction element 7 in this embodiment.

Figure 26:
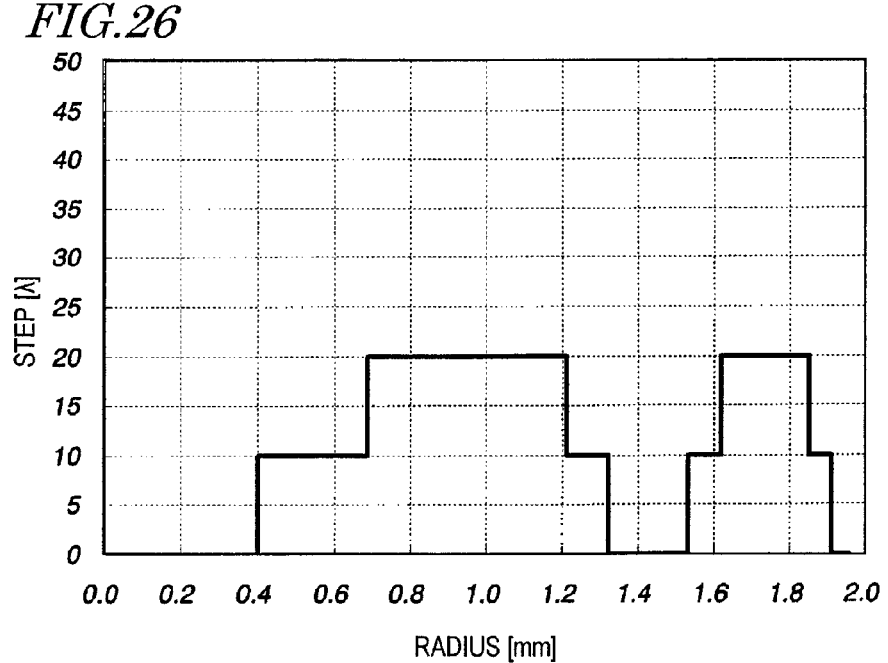
FIG. 26 shows an exemplary shape of a phase step.

FIG. 26 shows an example of shape of the phase step. In FIG. 26, the horizontal axis represents the radius of the chromatic aberration correction element 47, and the vertical axis represents the phase shift amount generated by the phase step. The phase shift amount is represented with the integer by which the wavelength λ is multiplied, where 1λ is the designing wavelength of 405 nm.

As shown in FIG. 26, in this embodiment, the phase step is set such that the difference in the optical path length generated when the laser light having the wavelength λ is transmitted through the phase step is an integral multiple of 10λ (10λ and 20λ). By setting the phase step to an integral multiple of 10×, a high-order spherical aberration in accordance with a change in the wavelength of the blue violet laser light can be generated without influencing the wave front of the red laser light (wavelength: 655 nm) or the infrared laser light (wavelength: 785 nm). FIG. 26(d) shows the shape of the wave front corrected by such a phase step.

The phase step may be located in the optical path as an independent optical element, but alternatively, may be formed in the concave lens face of the chromatic aberration correction element 47 to be integral with the diffraction face as shown in this embodiment. In this case, the number of parts can be reduced, which is more preferable in terms of size reduction and cost reduction.

As described above, regarding the spherical aberrations caused along with a change in the wavelength, a three-order aberration can be corrected by moving the collimator lens 46 and also a higher-order aberration can be corrected by using a phase step.

As described above, the optical head 100 in this embodiment provides good optical performances for light sources for emitting three wavelengths of laser light, i.e., blue violet laser light, red laser light and infrared laser light, and for performing recording to or reproduction from optical discs corresponding to these wavelengths of laser light. The optical head using an objective lens according to the present invention can perform recording to or reproduction from three types of optical discs of, for example, BD, DVD and CD in an excellent manner.

The wavelength of the light to be emitted by each light source, the position of each light source, and the position of a light receiving element 9 may be changed when necessary. The light receiving/emitting integrated element 50 may be divided into a light source and a light receiving element. By contrast, the light source 2 and the light receiving element 9 may be located at the same position to provide a light receiving/emitting integrated element. Only all the light sources may be integrated, or all the light receiving elements may additionally be located at the same position to provide a light receiving/emitting integrated element.

The optical discs are not limited to the BD 60, the DVD 70 and the CD 80. The optical head may be constructed so as to be compatible to different types of optical discs of, for example, another high density optical disc (protective substrate thickness: about 0.6 mm, NA: 0.65) instead of the BD, the DVD (protective substrate thickness: about 0.6 mm, NA: 0.60) and the CD (protective substrate thickness: about 1.2 mm, NA: 0.47).

In the above, the optical head is described as including the objective lens 1 according to the embodiment. Instead of the objective lens 1, the objective lens 21 according to Embodiment 2 may be usable.

Embodiment 5

Figure 27:
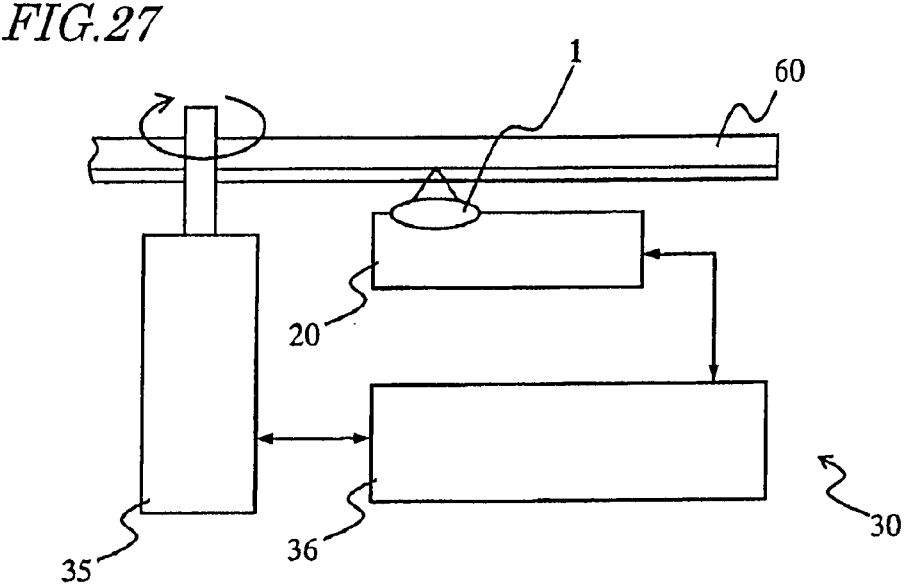
FIG. 27 is a view showing a schematic structure of an optical disc apparatus 30 according Embodiment 5.
Figure 28:
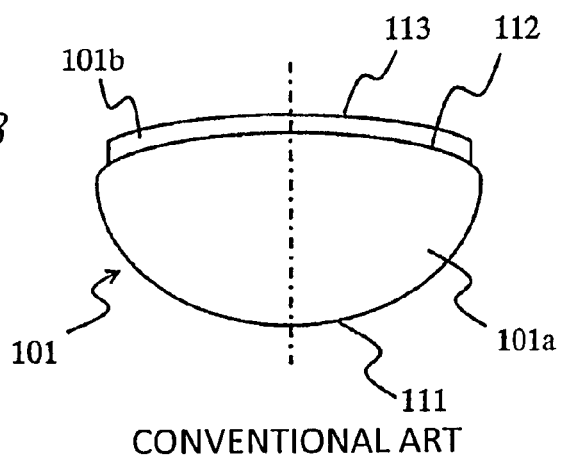
FIG. 28 is a view showing a structure of an objective lens 101 according to a first conventional example.
Figure 29:
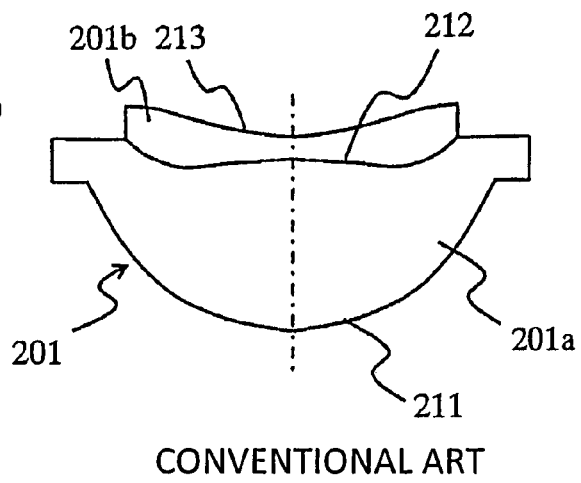
FIG. 29 is a view showing a structure of an objective lens 201 according to a second conventional example.

FIG. 27 shows a schematic structure of an optical disc apparatus 30 according to this embodiment.

The optical disc apparatus 30 includes an optical head 20, an optical head driving section 35, and a control section 36. FIG. 27 shows the BD 60 mounted on the optical disc apparatus 30 for the sake of illustration. Needless to say, the BD 60 may be replaced with the DVD 70 or the CD 80. The BD 60, the DVD 70 and or the CD 80 are dismountable from the optical disc apparatus 30 and is not an element thereof. The following description will be given with an assumption that the BD 60 is used as an example of the optical disc, unless otherwise specified.

The optical disc driving section 35 is a motor for driving the BD 60 to rotate.

The optical head 20 is an optical head according to Embodiment 3 or 4.

The control section 36 is a so-called optical disc controller, and drives and controls the optical disc driving section 35 and the optical head 20. The control section 36 processes a control signal and an information signal received by the optical head 20 and causes the information signal to interface between the elements of the optical disc apparatus 30 and an external device (for example, a host computer).

An example of processing performed by the control section 36 will be described. The control section 36 outputs a control signal, to the optical disc driving section 35, for driving the optical disc mounted thereon to rotate. When determining that the mounted optical disc is the BD 60, the control section 36 instructs to emit blue violet laser light from the light source. Then, the control section 36 sends a driving signal to the driving mechanism of the collimator lens mentioned in Embodiments 3 and 4 (for example, FIGS. 19(a) and (b)) to control the movement of the collimator lens in the optical axis direction. Thus, the laser light emitted by the light source is converted into substantially parallel light by the collimator lens. The control section 36 also sends a control signal, to the aperture restriction element 5, for restricting the aperture to have a numerical aperture (NA) of 0.85.

The optical disc apparatus 30 in this embodiment has one of the optical heads described in Embodiment 3 or 4, and therefore can perform recording or reproduction in an excellent manner, using the plurality of light sources, to or from an optical disc corresponding thereto.

INDUSTRIAL APPLICABILITY

An optical head using an objective lens according to the present invention is capable of performing recording to or reproduction from a high density optical disc, a DVD and a CD. Therefore, the structure of the optical head is simplified and the productivity is improved. In addition, the optical disc apparatus itself can be reduced in size and weight, can operate more precisely, and can be provided at lower cost.

The invention claimed is:

1. An objective lens to be incorporated into an optical head, wherein:
the objective lens includes a first lens and a second lens substantially in close contact with each other such that optical axes thereof match each other, and acts as a convex lens as a whole;
the first lens and the second lens each include a central portion including the optical axis and a peripheral portion located in a periphery of the central portion;
the central portion of the first lens acts as a convex lens;

the central portion of the second lens acts as a concave lens; and where the refractive index of the first lens at d line (wavelength: 587.56 nm) is nd1, the Abbe constant of the first lens represented using the refractive indices at d line, F line (wavelength: 486.13 nm) and C line (wavelength: 656.27 nm) is vd1, the refractive index of the second lens at d line is nd2, and the Abbe constant of the second lens represented using the refractive indices at d line, F line and C line is vd2, the objective lens fulfills nd1>nd2 and vd1>vd2; and the objective lens has three lens faces crossing the optical axis of:
- a first lens face which is a lens face of the first lens which is not in contact with the second lens,
- a second lens face which is a border between the first lens and the second lens substantially in close contact with each other, and
- a third lens face which is a lens face of the second lens which is not in contact with the first lens; and among effective areas of at least one of the first lens face, the second lens face and the third lens face, a central effective area including the optical axis and a peripheral effective area located in a periphery of the central effective area are formed in different aspheric shapes;

wherein in each of the first lens face, the second lens face and the third lens face, the central effective area and the peripheral effective area are formed in different aspheric shapes, and light from a light source of the optical head is incident on the peripheral effective area.

2. The objective lens of claim 1, wherein:
the refractive index nd1 fulfills 1.60<nd1<1.85;
the refractive index nd2 fulfills 1.45<nd2<1.60;
the Abbe constant vd1 fulfills 40<vd1<60; and
the Abbe constant vd2 fulfills 20<vd2<40.

3. The objective lens of claim 1, wherein the first lens is formed of a glass material, and the second lens is formed of a resin material.

4. The objective lens of claim 1, wherein the first lens and the second lens are formed of glass materials, and the first lens and the second lens are formed of glass materials having different glass transition temperatures.

5. The objective lens of claim 1, wherein where an angle between a tangent plane contacting an arbitrary point on a plane within an effective diameter of the second lens face and a reference plane which is a plane perpendicular to the optical axis is e, the value of e varies at a border between the central effective area and the peripheral effective area of the second lens face.

6. An optical head, comprising:
a plurality of light sources for emitting light of different wavelengths; and
an objective lens of claim 1 for converging light emitted from one of the plurality of light sources, wherein,
the objective lens converges light from a first light source among the plurality of light sources by the central portion and the peripheral portion thereof; and
the objective lens converges light from a second light source among the plurality of light sources substantially by only the central portion thereof.

7. The optical head of claim 6, further comprising a conversion section for converting the light into substantially parallel light, diverging light or converging light in accordance with the wavelength of the light and causing the converted light to be incident on the objective lens,
wherein the first light source emits light of a shorter wavelength than the second light source.

8. The optical head of claim 6, further comprising a third light source for emitting light of a longer wavelength than the first light source and the second light source, wherein:
the first light source emits light of a first wavelength $\lambda 1$, the second light source emits light of a second wavelength $\lambda 2$, and the third light source emits light of a third wavelength $\lambda 3$; and
the wavelength $\lambda 1$, the wavelength $\lambda 2$ and the wavelength $\lambda 3$ fulfill:
350 nm<$\lambda 1$<450 nm,
600 nm<$\lambda 2$<700 nm, and
700 nm<$\lambda 3$<850 nm,
the optical head further comprising an optical element acting as a phase step for a part of the light of the wavelength $\lambda 1$,
wherein the phase step is constructed such that a difference in an optical path length caused when the light of the wavelength $\lambda 1$ passes the phase step is substantially 10 times the wavelength $\lambda 1$, and thus corrects the spherical aberration caused at a position of a focal point of the light by the change in the wavelength of the light of the wavelength $\lambda 1$.

9. The optical head of claim 8, wherein among the spherical aberrations caused along with the change in the wavelength of the light of the wavelength of $\lambda 1$,
a conversion section mainly corrects a third-order spherical aberration; and
the phase step mainly corrects a five- or higher-order spherical aberration.

10. An optical drive, comprising:
an optical head of claim 6;
a motor for driving an optical recording medium to rotate; and
a control section for controlling the optical head and the motor.

11. The objective lens of claim 1, wherein the optical head comprises:
a first light source for emitting light of a first wavelength $\lambda 1$, a second light source for emitting light of a second wavelength $\lambda 2$ and a third light source for emitting light of a third wavelength $\lambda 3$,
the wavelength $\lambda 1$, the wavelength $\lambda 2$ and the wavelength $\lambda 3$ fulfill:
350 nm<$\lambda 1$<450 nm,
600 nm<$\lambda 2$<700 nm, and
700 nm<$\lambda 3$<850 nm;
wherein, the central portion defined by the central effective area converges the light of the first, the second and the third wavelength $\lambda 1$, $\lambda 2$ and $\lambda 3$ respectively and the peripheral portion defined by the peripheral effective area only converges the light of the wavelength $\lambda 1$.

12. An objective lens to be incorporated into an optical head, wherein:
the objective lens includes a first lens and a second lens substantially in close contact with each other such that optical axes thereof match each other, and acts as a convex lens as a whole;
the first lens and the second lens each include a central portion including the optical axis and a peripheral portion located in a periphery of the central portion;
the central portion of the first lens acts as a convex lens;
the central portion of the second lens acts as a concave lens; and
at least one lens face of the objective lens crossing the optical axis includes a central effective area including the optical axis and a peripheral effective area not including the optical axis, and the central effective area and the peripheral effective area are formed in aspheric shapes represented by different aspheric coefficients; and the first lens and the second lens define:

a first lens face which is a lens face of the first lens which is not in contact with the second lens, a second lens face which is a border between the first lens and the second lens substantially in close contact with each other, and a third lens face which is a lens face of the second lens which is not in contact with the first lens; and among effective areas of at least one of the first lens face, the second lens face and the third lens face, a central effective area including the optical axis and a peripheral effective area located in a periphery of the central effective area are formed in different aspheric shapes;

wherein in each of the first lens face, the second lens face and the third lens face, the central effective area and the peripheral effective area are formed in different aspheric shapes, and light from a light source of the optical head is incident on the peripheral effective area.

13. The objective lens of claim 12, wherein the optical head comprises:

a first light source for emitting light of a first wavelength $\lambda 1$, a second light source for emitting light of a second wavelength $\lambda 2$ and a third light source for emitting light of a third wavelength $\lambda 3$, the wavelength $\lambda 1$, the wavelength $\lambda 2$ and the wavelength $\lambda 3$ fulfill:

350 nm<$\lambda 1$<450 nm, 600 nm<$\lambda 2$<700 nm, and 700 nm<$\lambda 3$<850 nm;

wherein, the central portion defined by the central effective area converges the light of the first, the second and the third wavelength $\lambda 1$, $\lambda 2$ and $\lambda 3$ respectively and the peripheral portion defined by the peripheral effective area only converges the light of the wavelength $\lambda 1$.

* * * * *

UNITED STATES PATENT AND TRADEMARK OFFICE
CERTIFICATE OF CORRECTION

| | |
|---|---|
| PATENT NO. | : 8,233,371 B2 |
| APPLICATION NO. | : 12/159425 |
| DATED | : July 31, 2012 |
| INVENTOR(S) | : Fumitomo Yamasaki et al. |

It is certified that error appears in the above-identified patent and that said Letters Patent is hereby corrected as shown below:

Column 35, line 47, "axis is e, the value of e varies" should read -- axis is θ, the value of θ varies --.

Signed and Sealed this
Sixth Day of November, 2012

David J. Kappos
*Director of the United States Patent and Trademark Office*